(12) United States Patent
Terdy et al.

(10) Patent No.: US 10,988,165 B2
(45) Date of Patent: Apr. 27, 2021

(54) CONTROL FOR ELECTRIC POWER STEERING

(71) Applicant: TRW Limited, Solihull (GB)

(72) Inventors: Tamas Terdy, Solihull (GB); Charles Mahendhrarajah, Solihull (GB); Nathanael Rice, Solihull (GB); Maciej Kudanowski, Solihull (GB)

(73) Assignee: TRW Limited, Solihull (GB)

( * ) Notice: Subject to any disclaimer, the term of this patent is extended or adjusted under 35 U.S.C. 154(b) by 628 days.

(21) Appl. No.: 15/831,700

(22) Filed: Dec. 5, 2017

(65) Prior Publication Data

US 2018/0178833 A1 Jun. 28, 2018

(30) Foreign Application Priority Data

Dec. 5, 2016 (GB) .................................... 1620650

(51) Int. Cl.
*H02P 6/16* (2016.01)
*H02P 5/74* (2006.01)
(Continued)

(52) U.S. Cl.
CPC ......... *B62D 5/0463* (2013.01); *B62D 5/0409* (2013.01); *B62D 5/0484* (2013.01);
(Continued)

(58) Field of Classification Search
CPC ................ H02P 6/16; H02P 6/14; H02H 3/05
See application file for complete search history.

(56) References Cited

U.S. PATENT DOCUMENTS 5,969,919 A   10/1999   Kobayashi et al.
2011/0043152 A1   2/2011   Kidokoro et al.
(Continued)

FOREIGN PATENT DOCUMENTS

JP   H0851799 A   2/1996
JP   2003299367 A   10/2003
(Continued)

OTHER PUBLICATIONS

UK Search Report, Application No. GB1620650.0, dated May 26, 2017.

*Primary Examiner* — Kawing Chan
*Assistant Examiner* — Charles S Laughlin
(74) *Attorney, Agent, or Firm* — MacMillan, Sobanski & Todd, LLC

(57) ABSTRACT

A method of controlling an electric power assisted steering (EPS) system comprising one or more inverter bridges each connected to a multi-phase motor configured to provide power assist to steering of a vehicle, each inverter comprising a plurality of switching elements each associated with a phase of the motor, is provided. The method comprises, preventing current flow in said one or more affected inverters by applying a gate-source voltage to one or more of the switching elements of the affected inverter bridge(s) in response to detecting a predefined event affecting current flow in one or more of the inverter bridges. A control system for an electric power assisted steering apparatus comprising one or more inverter bridges and a control means configured to control the switching elements in accordance with the method is also provided.

21 Claims, 18 Drawing Sheets

(51) Int. Cl.
*H02M 7/49* (2007.01)
*B62D 5/04* (2006.01)
*H02H 7/122* (2006.01)
*H02M 7/5387* (2007.01)

(52) U.S. Cl.
CPC ......... *B62D 5/0487* (2013.01); *H02H 7/1225* (2013.01); *H02H 7/1227* (2013.01); *H02M 7/53871* (2013.01)

(56) References Cited

U.S. PATENT DOCUMENTS

| | | | |
|---|---|---|---|
| 2011/0074323 A1* | 3/2011 | Mukai | B62D 5/0487 318/400.21 |
| 2013/0299271 A1 | 11/2013 | Endo et al. | |
| 2013/0314014 A1* | 11/2013 | Tremel | H02M 1/32 318/400.22 |
| 2014/0077745 A1 | 3/2014 | Kinouchi et al. | |
| 2014/0217940 A1* | 8/2014 | Kawamura | B62D 5/0481 318/400.26 |
| 2015/0130383 A1* | 5/2015 | Plaideau | B62D 5/046 318/400.22 |
| 2015/0280609 A1* | 10/2015 | Murata | H02M 7/537 363/97 |

FOREIGN PATENT DOCUMENTS

| | | |
|---|---|---|
| JP | 2004064822 A | 2/2004 |
| KR | 20090120048 A | 11/2009 |
| WO | 2016038362 A1 | 3/2016 |

* cited by examiner

CONTROL FOR ELECTRIC POWER STEERING

CROSS-REFERENCE TO RELATED APPLICATIONS

This application claims priority to Britain Patent Application No. 1620650.0, filed 5 Dec. 2016, the disclosures of which are incorporated herein by reference in entirety.

BACKGROUND OF THE INVENTION

The present invention relates to control of an electric power assisted steering (EPS) system. In particular, the invention relates to eliminating damping currents in EPS systems without the need for a separate phase isolation relay.

Electric Power Assisted Steering systems are well known in the prior art. The power generated by an electric motor is used to generate an assistance torque in the steering column in the same direction as a detected demand torque generated by a driver of the vehicle turning a steering wheel.

A typical inverter bridge employed in an EPS system comprises a plurality of semiconductor switching elements which control the current delivered to the motor and thus the rotation of the motor. If a fault occurs in one of the switching elements, for example a short-circuit (ON) failure, the inverter can in principle be disabled by opening (switching off) the remaining "good" switching elements. FIG. 1 schematically represents power flow in an EPS system 100 having two inverter bridges. A battery 110 powers a dual inverter bridge 120, 120' and two motors 130, 130' that act on the same steering rack. They have independent stators but share the same rotor. As such, each motor 130, 130' contributes approximately 50% to assist steering. In the case of a fault with one of the inverter bridges 120, as exemplified in FIG. 2, the EPS system remains operational since the other inverter bridge 120' can still provide assistance. However, depending on the motor speed and position, the generation of a back-EMF (also known as regeneration voltage) within the motor 130 can drive damping currents within the faulty inverter bridge, even if it is disabled.

Common switching elements, for example, MOSFETs, typically have an intrinsic parasitic "body" diode in parallel to the transistor channel which allows damping currents to circulate in the faulty inverter when the back-EMF exceeds the threshold forward voltage, even when the switching elements are turned OFF.

These damping currents generate a torque that opposes the motion of the motor, that is, a breaking torque that increases the resistance to steering felt by a driver. Meanwhile, damping currents can also lead to excessive heat generation that can cause further failures in the EPS system. It is of course desirable to maintain steering assistance even in the event of a fault, but such further failures put that in jeopardy. While total loss of steering is avoided in such dual-bridge designs, the damping in the faulty bridge reduces the amount of assistance available to the driver from the remaining healthy inverter to below 50%.

Known ways of addressing this problem include breaking the phase connection between the faulty inverter and the motor to avoid a closed loop for circulating damping currents, which requires additional power components such as built-in blocking switches or relays. For the majority of times, when there is no fault, these components serve no useful function but still occupy valuable space, dissipate heat and are expensive.

As such, an alternative way to suppress damping currents is desirable. Aspects and embodiments of the present invention have been devised with the foregoing in mind.

BRIEF SUMMARY OF THE INVENTION

In accordance with a first aspect of the invention, there is provided a method of controlling an electric power assisted steering (EPS) system comprising one or more inverter bridges each connected to a multi-phase motor configured to provide power assist to steering of a vehicle, wherein each inverter comprises a plurality of switching elements each associated with a phase of the motor. The method may comprise, in response to detecting a predefined event affecting current flow in one or more of the inverter bridges, preventing current flow in said one or more affected inverters. This may be achieved by applying a gate-source voltage to one or more of the switching elements of the affected inverter bridge(s).

Advantageously, the invention prevents, or at least substantially suppresses, damping currents without the need for additional circuit components such as a blocking relays or switches which occupy valuable space, dissipate power and are expensive. When a fault is detected, aspects and embodiments of the invention allow the faulty inverter to be effectively disabled. Furthermore, embodiments of the invention avoid the issues caused by known inverters that utilise switching elements that exhibit parasitic body diode behaviours.

The multi-phase motor may be configured to act on a single steering rack of the EPS system.

In an aspect or embodiment of the invention, the predefined event may be or comprise a failure event at or within one of said switching elements within an inverter bridge, or an interruption of power to the EPS system.

A failure event at or within one of said switching elements may be any event that prevents the switching element from being turned off. For example it may be a short-circuit failure, or a fault in its control circuit which provides the gate voltage.

If a failure event in one of the switching elements of an inverter is detected, aspects and embodiments of the invention provide a method of disabling the affected inverter by blocking current flow in the affected inverter. The one or more unaffected inverters may continue to operate normally.

If an interruption of power to the EPS system is detected, aspects and embodiments of the invention provide a method of disabling any or all of the inverters by blocking current flow in those inverters. An event causing an interruption of power may be when the vehicle is turned off, for example, when it is parked. It may also include events such when a vehicle is being serviced at a garage.

The invention advantageously provides a method of protecting the EPS when the vehicle is switched and subjected to wheel/steering movement/rotation that may generate a back-EMF and cause current flow uncontrolled in the inverters.

The switching elements may be configured to conduct in the off-state when reverse biased beyond a reverse conduction threshold voltage.

Applying the gate-source voltage may comprise applying a negative gate-source voltage to control the reverse conduction threshold voltage of the switching elements in the off-state.

The method may further comprise controlling the reverse bias threshold voltage to be greater than the reverse bias applied to the switching device. In this way aspects and embodiments of the invention provide a method of ensuring the switching device remains off to block damping currents when subjected to high back EMF generated from the motor.

The method may further comprise applying the gate-source voltage to the switching device using a gate driver. The gate driver may be connected to a gate electrode and a source electrode.

The method may further comprise operating the EPS system in normal mode, where the switching elements are controlled normally, and a blocking mode when a predefined event is detected.

Blocking mode may be enabled by applying a gate-source voltage to the switching elements using the gate driver. The gate-source voltage may be zero or negative.

In accordance with an embodiment of the invention, a switch may be positioned between the gate driver and the source electrode and a resistor is connected between the gate and drain electrode. The switch has a diode connected across it in parallel. The diode may be configured to be biased in the same direction as the switching element. The resistor circuit for use with an EPS system may also be a separate aspect of the invention.

In accordance with this embodiment, blocking mode may be enabled by opening the switch to disconnect the gate driver from driving the switching element.

The method may comprise applying the gate-source voltage using a phase voltage generated by the motor (the back-EMF). Opening the switch may allow the gate voltage to follow a drain voltage. Opening the switch may allow the applied gate-source voltage to be determined by the reverse bias across the switching element.

When the switch is open the applied gate-source voltage may be determined by the value of phase voltage. When the switch is opened, blocking mode may operate in one of two modes:

In a first blocking mode, the applied gate-source voltage is negative. The applied gate-source voltage may be determined by the phase voltage generated by the motor (the back-EMF). The applied negative gate-source voltage may be determined by the reverse bias across the switching element. The first blocking mode is enabled when the phase voltage is outside the supply voltage to the inverter (e.g. greater than the battery voltage or lower than ground). The switching element and the diode are reverse biased and the gate driver remains disconnected from switching element.

In a second blocking mode, the applied gate-source voltage is determined by the gate driver and the method may comprise using the gate driver to hold the switching devices off. Here, the applied gate-source voltage may be zero or negative. This blocking mode is enabled when the phase voltage is between the supply voltages (e.g. less than the battery voltage or higher than ground). In the second blocking mode, the switching device and the diode are forward biased and the gate drive remains connected to the switching element.

The method may further comprise determining the reverse bias across the switching element and controlling the reverse conduction threshold voltage in the off-state to be greater than the reverse bias applied across the switching element to prevent current flow.

Preventing current flow in an affected inverter in response to detecting a failure event at or within one of said switching elements within the affected inverter bridge may further comprise switching off the other switching elements in the affected inverter.

Preventing current flow within an affected inverter in response to detection of an interruption of power to the EPS apparatus may further comprise switching off every switching element in each inverter.

A negative or zero gate-source voltage may be applied when the current flowing in each phase is below a predefined threshold current value.

The switch may be opened when the current flowing in each phase is below a predefined threshold current value.

Enabling blocking mode may comprise first setting zero gate-source voltage when the current flowing in each phase is below a predefined threshold current value, and then applying a negative gate-source voltage, or opening the switch.

Detecting a failure event may comprise monitoring one or more of: the source-drain voltage of the/each switching element; the current direction within the/each switching element; the current or voltage on the motor phases. The method may further comprise comparing one or more of these determined parameters to a corresponding predetermined threshold value.

Advantageously, preventing current flow in an affected inverter can occur without using additional current blocking switching elements between the motor and the inverter.

The applied gate-source voltage may be less than the maximum source-gate voltage rating of the switching device. The applied gate-source voltage may be substantially in the range 0V to −1V, or it may be substantially in the range −1V to −2 V, or it may be substantially in the range −2V to −3V, or it may be substantially in the range −3V to −4V, or it may be substantially in the range −4V to −5V.

In accordance with second aspect of the invention, there is a system for an electric power assisted steering (EPS) apparatus comprising one or more inverter bridges. Each inverter bridge may be connected to a multi-phase motor configured to provide power assist to steering of a vehicle. Each inverter bridge may have a plurality of switching elements each associated with a phase of the motor. The EPS system may have a control means configured to control the switching elements to control current to the phases of the motor under normal operation. In response to detecting a predefined event affecting current flow in one or more of the inverter bridges, it may control the switching elements in a blocking mode to prevent current flowing in the one or more affected inverter bridges by applying a gate-source voltage to one or more of the switching elements of the affected inverter bridges. This may be achieved in accordance with the method of the first aspect.

The switching elements may be configured to conduct in the off-state when reverse biased beyond a reverse conduction threshold voltage, wherein, when in blocking mode, the control means is configured to control the reverse conduction threshold voltage by applying a gate-source voltage to the switching element. The gate-source voltage may be negative.

The control means may comprise a gate driver connected between a gate electrode and a source electrode of the switching element.

In an embodiment, the control means may further comprise a resistor connecting the gate electrode to a drain electrode of the switching element; a switch connected between the gate driver and the source electrode, wherein the switch is configured to be closed under normal operation and open in blocking mode; and a diode connected in parallel to the switch.

The switch and diode may be connected between the gate driver and the gate electrode.

In blocking mode the control means may be configured to disconnect the gate driver from driving the switching device when the switching element is reverse biased, such that the voltage on the gate electrode follows the drain voltage and the gate-source voltage is applied by a phase voltage generated from the motor Alternatively, in the blocking mode, the control means may be configured to maintain the gate driver connection when the switching element is forward biased.

The system may further comprise a failure event detection means. The failure detection means may comprise monitoring means configured to monitor one or more of: the source-drain voltage of the/each switching element; the current direction within the/each switching element; the current or voltage on the motor phases. The monitoring means or other device may be configured to compare one or more of these determined parameters to a corresponding predetermined threshold value.

The reverse conduction threshold voltage of the switching elements may be greater than approximately 0.6V. The threshold voltage may be greater than approximately 1V. The threshold voltage may be greater than approximately 2V. The threshold voltage may be substantially equal to or greater than a back-EMF generated by the motor. The threshold voltage may be substantially equal to or greater than the reverse bias applied to the device by the motor.

In embodiments according to first and second aspects of the invention, the applied gate-source voltage may be substantially between 0V and −4V. In an embodiment it may be less than the maximum source-gate voltage rating of the switching device.

In embodiments according to the first and second aspects of the invention, the switching elements may be Gallium Nitride field effect transistors (FET) and, optionally or preferably, are n-type enhancement mode Gallium Nitride FETs.

GaN switching elements are conventionally utilised in higher voltage applications, and not in automotive applications such as power steering. Embodiments of the invention utilise GaN devices suitable for use in automotive 12V and 48V applications. Advantageously, embodiments of the invention utilise such switching elements that do not exhibit the parasitic body diode behaviours of MOSFETs observed in current arrangements. Aspects and embodiments of the invention provide control over the reverse conduction in the switching device when it is nominally turned OFF or, more specifically, control the reverse conduction threshold voltage such that it is comparable to or preferably greater than the reverse bias on the device generated by high back-EMFs the motor. Thus the invention is not limited to GaN devices, and any semiconductor switching device that exhibits a body diode or diode-like behaviour when nominally switched OFF with a gate tuneable threshold voltage can be utilised to achieve the solution.

In embodiments according to first and second aspects of the invention, the EPS system may comprise at least two inverter bridges. When a predefined event is detected that affects current flow in one inverter bridge, the method may further comprise using one or more of said other inverter bridges to provide power assistance. Alternatively, the EPS system may comprise a single inverter bridge. Here, the reverse blocking capability could enable the phase isolation switches to be removed. However, steering assist would not be provided as there's no redundancy in the system.

Features which are described in the context of separate aspects and embodiments of the invention may be used together and/or be interchangeable. Similarly, where features are, for brevity, described in the context of a single embodiment, these may also be provided separately or in any suitable sub-combination. Features described in connection with the device may have corresponding features definable with respect to the method(s) and the computer program and these embodiments are specifically envisaged.

Where reference is made to an "event" or "fault condition" or the like, this is to be construed broadly. It should be understood that this covers "internal" failures/faults e.g. a short circuit. It also covers "external" events that may cause a FET to be subjected to a high back-EMF e.g. the EPS motor being externally rotated (by a service engineer) at high speed during garage servicing of a vehicle and thus acting as a generator.

Other advantages of this invention will become apparent to those skilled in the art from the following detailed description of the preferred embodiments, when read in light of the accompanying drawings.

DETAILED DESCRIPTION OF THE INVENTION

Figure 1:
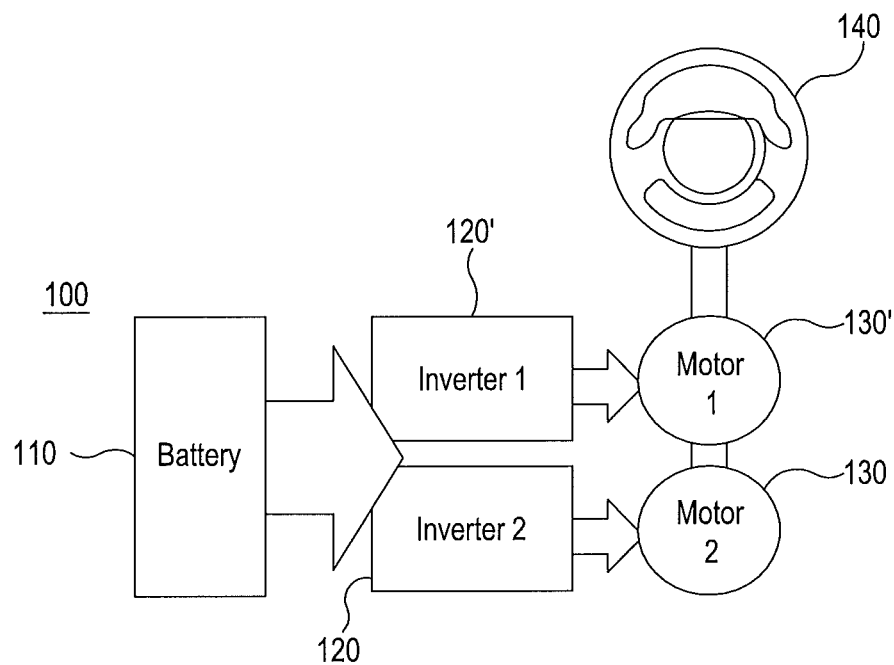
FIGS. 1 and 2 show a known dual-bridge EPS control system.
Figure 2:
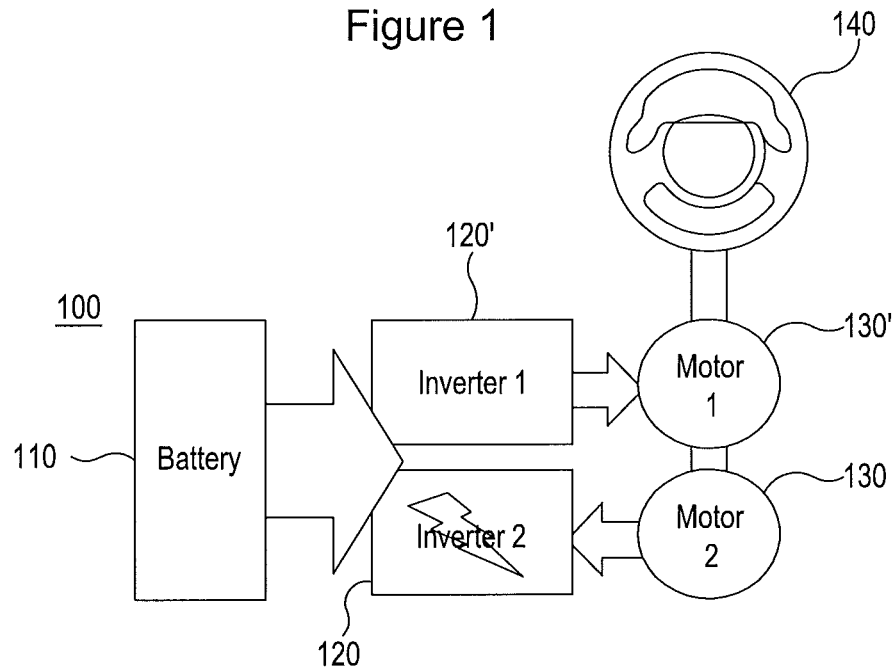

FIGS. 1 and 2 represent a known dual-bridge EPS control system 100. The system comprises first 120 and second 120' inverter bridges connected to and configured to drive first 130 and second 130' motors, respectively. When the steering wheel 140 of a vehicle (not shown) is operated by a driver, a demand torque is detected by the system. The motors 130, 130' generate an assistance torque, dependent on the demand torque and vehicle speed, which acts on the steering rack to assist steering the vehicle. The two motors 130, 130' may be physically located in one housing or separately but, in either case, they act on the same steering rack and, in normal operation, each contribute approximately 50% of the steering power. The motors 130, 130' may conveniently be brushless 3-phase AC permanent magnet synchronous (PMSM) motors.

Figure 3:
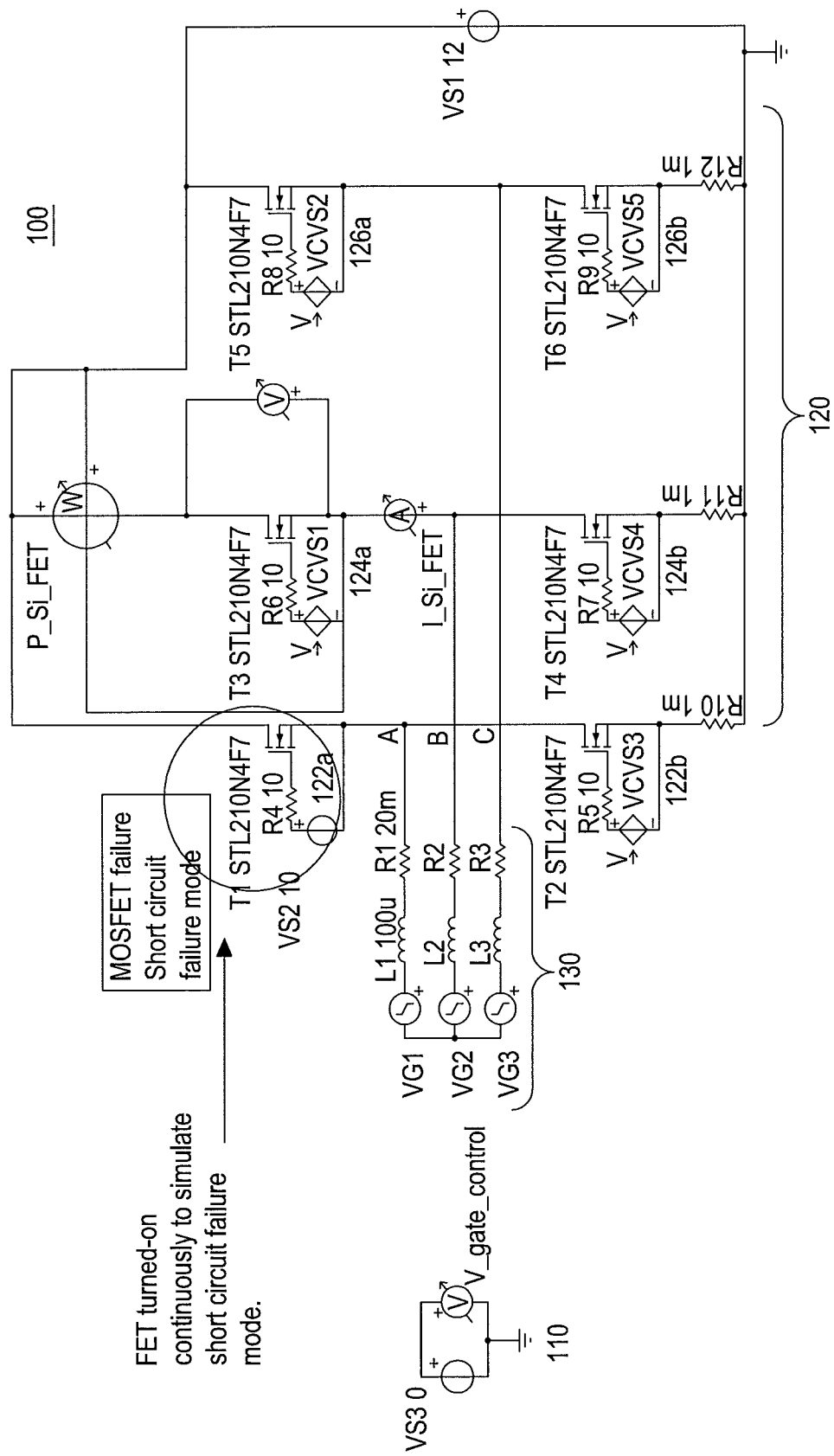
FIG. 3 shows a simplified schematic of one side of a dual-bridge system comprising Silicon MOSFETs.

FIG. 3 shows a known circuit arrangement of an inverter bridge 120 used to drive a 3-phase motor 130, representing one half of the dual-bridge EPS control system 100 (e.g. as shown in FIGS. 1 and 2). As both inverter bridges of a dual-bridge control system are typically identical, only one will be described here. A DC voltage is applied by a battery 110 between a supply rail and a ground rail and is connected to a 3-phase motor 130 via an inverter 120. The inverter 120 comprises three parallel arms (A, B, C), each of which has a pair of Silicon (Si) MOSFETs 122a, 122b, 124a, 124b, 126a, 126b connected in series between a supply rail and a ground rail. The motor phases A, B, C are connected to each other in a star configuration and branch off from between a respective pair of MOSFETs. As such, MOSFETs 122a, 122b are connected to a first phase A of the motor 130, MOSFETs 124a, 124b are connected to a second phase B of the motor 130, and MOSFETs 126a, 126b are connected to a third phase C of the motor 130. The pairs of MOSFETs associated with each phase (arms A, B, C) are connected in parallel to each other and to the battery 110. A power filter (not shown) may be provided between the battery 110 and the MOSFETs 122a, 122b, 124a, 124b, 126a, 126b.

The MOSFETS are also arranged in two groups with MOSFETS 122a, 124a, 126a on the "high" side of the inverter 120 and MOSFETS 122b, 124b, 126b on the "low" side of the inverter 120. The terms "high" and "low" are labels for ease of reference only. Each MOSFET 122a, 122b, 124a, 124b, 126a, 126b comprises a transistor channel and an intrinsic body diode connected in parallel with the transistor channel. The gate of each MOSFET 122a, 122b, 124a, 124b, 126a, 126b is connected to a gate driver to switch each MOSFET ON or OFF. Each gate driver received control signals from a control block (not shown).

In use, the gate drivers (not shown) apply voltage signals to the gate of each MOSFET to switch them ON and OFF rapidly in a predefined sequence, thus controlling the voltage applied to each phase of the motor and current flowing through the windings. This in turn controls the strength and orientation of the magnetic field produced by the windings, and hence the torque and speed of the motor. By using a sufficiently rapid pulse width modulation (PWM) switching pattern, a phase drive waveform can be applied that approximates the ideal sinusoidal waveform required to rotate the motor smoothly. This applies for both bridges 120, 120' in normal operation, i.e. all MOSFETs of both bridges 120, 120' are turned ON and OFF in a controlled manner during normal operation.

Figure 5:
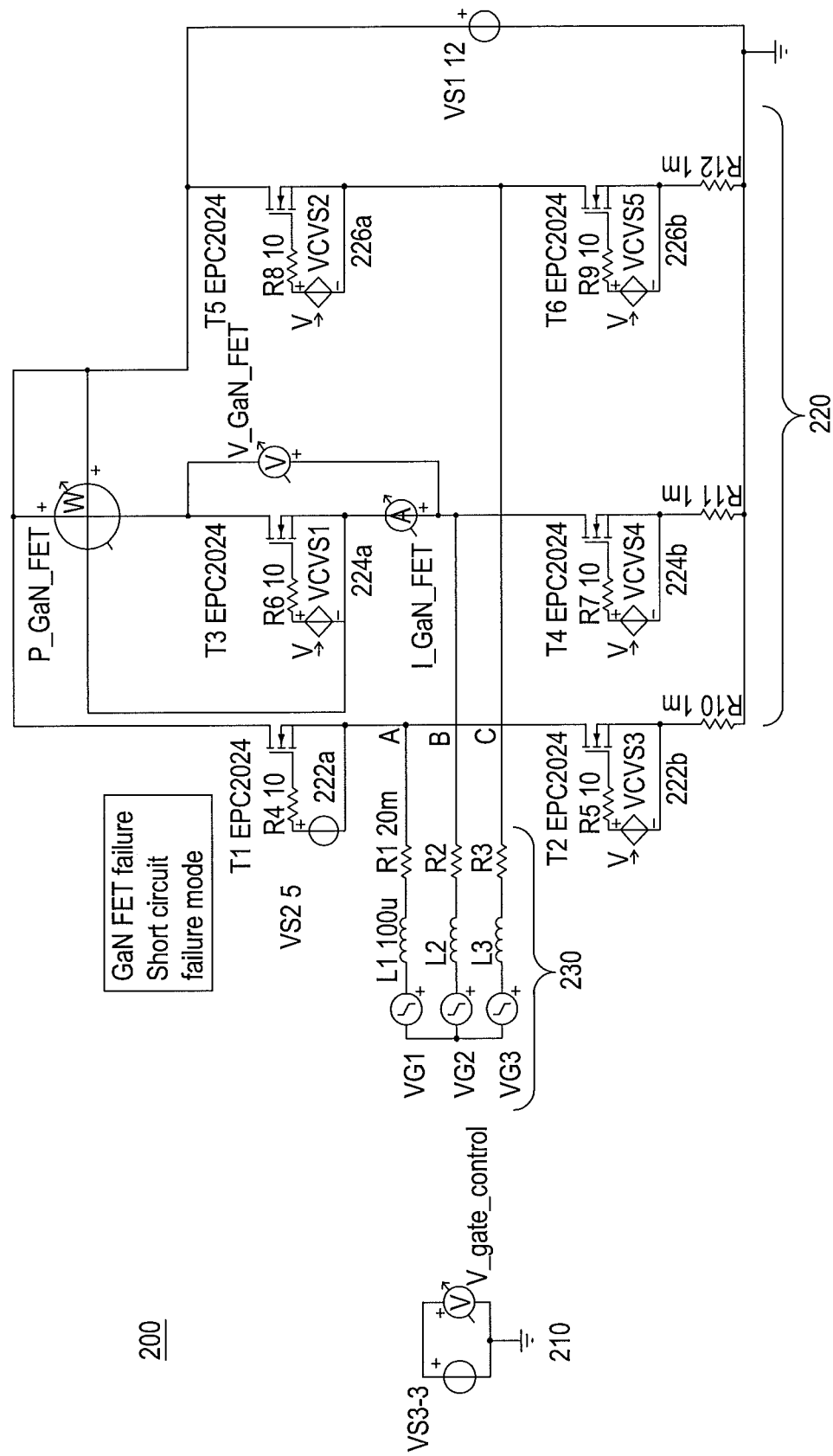
FIG. 5 shows a simplified schematic of one side of a dual-bridge system comprising GaN FETs.

A fault can develop on any or all of the MOSFETs 122a, 122b, 124a, 124b, 126a, 126b within an inverter 120, 120'. In the example of FIGS. 3 and 5 where one of the MOSFETs 122a of the inverter bridge 120 cannot be turned off (MOSFET 122a is used as an example only), for example, because it has failed in short-circuit failure mode, or there is a fault in its control circuit which provides the gate voltage, inverter 120' continues to operate normally, as described above. However, because there is no means to isolate the motor 130 from the faulty inverter 120 in this architecture, a back-EMF generated by the motor 130 as a result of the motor 130 still rotating can continue to drive current through the inverter 120 (depending on the speed and position of the motor 130), even if the inverter 120 is nominally disabled by switching OFF the remaining undamaged MOSFETS. In this case, a damping current, which can be excessive and uncontrolled, will flow through the now uncontrollable failed MOSFET 122a of the first phase A and the body diodes of the undamaged MOSFETs 124a, 126a in the other phases B, C when the back-EMF exceeds the threshold forward voltage of the body diodes of the undamaged MOSFETs 124a, 126a (typically 0.6V for Si MOSFETs). Note that the damping current is half-wave rectified due to conduction through the body diodes.

As such, although still providing steering assist to the vehicle driver, the working inverter bridge 120' has to overcome the damping effects of the faulty inverter 120. The total steering assist will be less than 50%. In the exemplary embodiment, with 40V Si MOSFETs and 100 A phase currents, the body diodes have a higher forward voltage drop for a given current than the MOSFET channel would if it were conducting. This leads to excess power dissipation (heat generation) which might lead to further failures. If the first fault leads to the failure of a MOSFET in another phase of the same bridge 120, e.g. MOSFET 124a, the circulating current will no longer be half-wave rectified but full AC. Full AC current increases the damping effect, and is thus undesirable.

Figure 4:
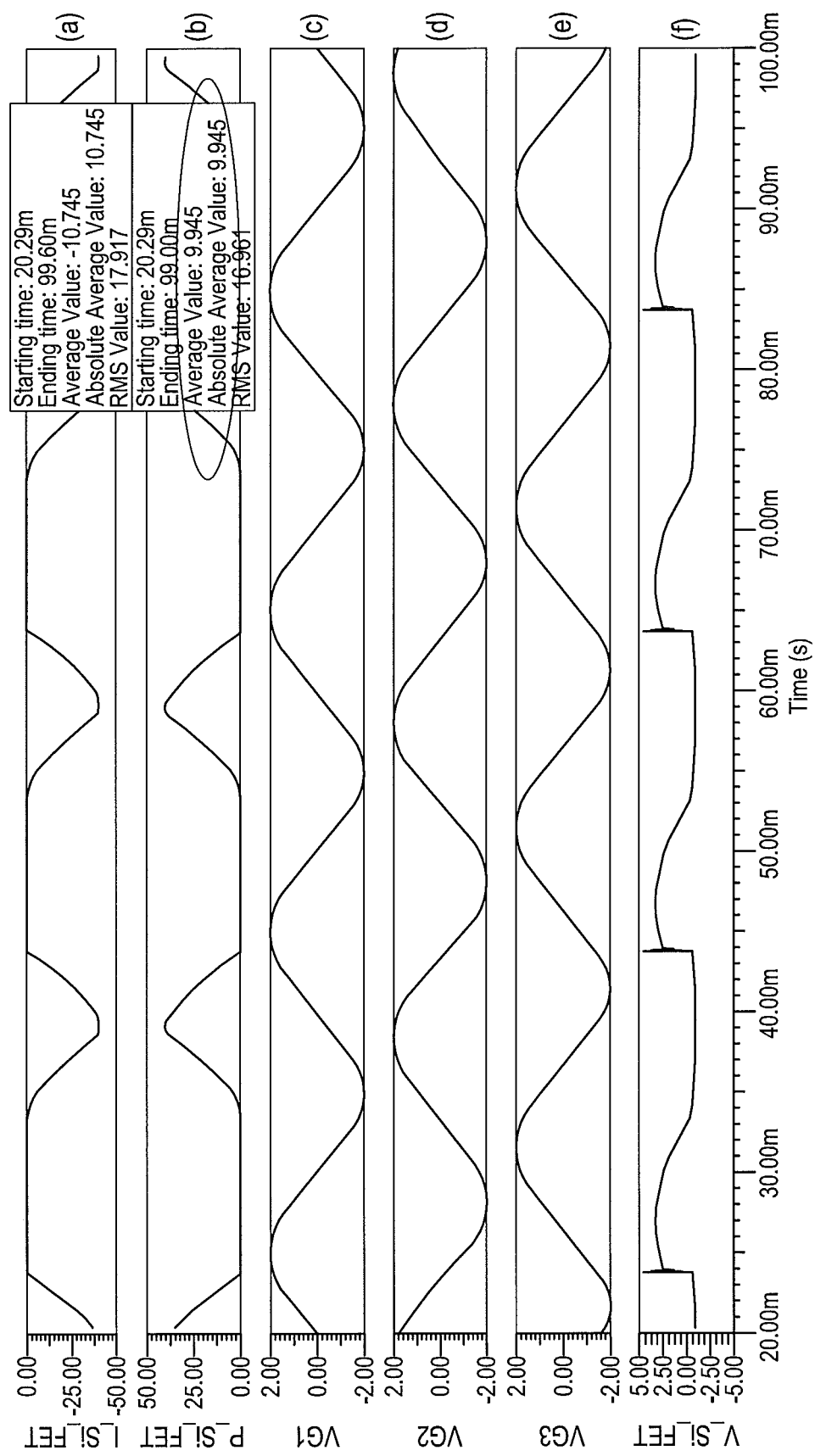
FIG. 4 shows simulation results for the circuit of FIG. 3.

FIG. 4 shows results of a simulation of the circuit shown in FIG. 3 when MOSFET 122a cannot be turned off and all other MOSFETs 122b, 124a, 124b, 126a, 126b are switched OFF. Si MOSFETs are assumed for the simulation. The motor back-EMF was arbitrarily set to 2V at a frequency of 50 Hz, the back EMF voltage peak was 6V, and the battery voltage was 12V. Graphs (a) and (b) respectively show the drain current ($I_d$) and power dissipation in the healthy MOSFET 124a against time (similar results are found for MOSFET 126a). These plots show a large negative current and high average power dissipation during periods when the body diode is conducting. Plots (c) to (e) show the back-EMF on each of the three phases. Plot (f) shows the corresponding MOSFET 124a source-drain voltage ($V_{DS}$), also exhibiting large voltage drops. High positive voltage drop (about 3V peak in this example) corresponds with when the MOSFET 124a is blocking the damping current. Here, the threshold forward voltage of the Si MOSFET body diode is 0.6V, thus when $V_{DS}$ is negative and exceeds that threshold, the body diode is conducting.

FIG. 5 shows one half of a dual-bridge EPS control system 200 according an embodiment of the invention. The system 200 comprises a battery 210, motor 230 and inverter 220 connected in a similar manner to that of system 100 described above. The inverter 220 comprises Gallium Nitride (GaN) power transistors 222a, 222b, 224a, 224b, 226a, 226b in the place of the Si MOSFETs 122a, 122b, 124a, 124b, 126a, 126b. The GaN FETs are grouped into "high side" and "low side" FETs 222a, 224a, 226a; 226a, 226b, 226c respectively.

The GaN FETs 222a, 222b, 224a, 224b, 226a, 226b are characterised, among other things, by the absence of an intrinsic body diode in parallel to the channel that is common to Si MOSFETs. As a result, GaN FETs have a different reverse bias operation mechanism in the off state. The GaN transistor is preferably an n-type enhancement mode transistor.

Similar to a Si MOSFET, when a GaN FET is nominally switched OFF, it will conduct when subjected to a reverse bias greater than a reverse conduction threshold voltage. Such a reverse bias may occur when subjected to high back-EMF generated by the motor. However, a key functional characteristic of the GaN FET is that the reverse conduction threshold voltage is gate tuneable and sufficiently large to suppress reverse conduction, when needed. It should be appreciated that the invention is not limited to GaN FETs but rather is applicable to any other emerging power transistor technology that exhibits the functional characteristics of the GaN FETs described here.

The gate is electrically insulated from, but capacitively coupled to, the channel via a gate insulator. With zero gate bias applied with respect to the source ($V_{GS}$), the channel region beneath the gate is depleted of electrons, such that the GaN transistor 222a, 222b, 224a, 224b, 226a, 226c is OFF (not conducting). In the OFF state, as $V_{DS}$ is decreased (negative), a positive bias is created on the gate with respect to the drain and drift region, injecting electrons under the gate. Once the gate threshold is reached, the GaN transistor channel will start to conduct. If $V_{DS}$ is increased (positive), a negative bias is created on the gate with respect to the drain and drift region, thus further depleting the transistor channel. As such, with zero $V_{GS}$, the GaN transistor 222a, 222b, 224a, 224b, 226a, 226c exhibits a diode-like behaviour similar to the body diode of a Si MOSFET. As it takes a gate threshold to turn on the GaN transistor under zero $V_{GS}$, the threshold forward voltage of the GaN "diode" is greater than the body diode of typical Si MOSFETs. Crucially, because a gate threshold must be reached for the GaN diode to conduct, this threshold can be tuned by applying a non-zero $V_{GS}$. Specifically, by applying a negative $V_{GS}$ the diode threshold can be further increased.

Figure 6:
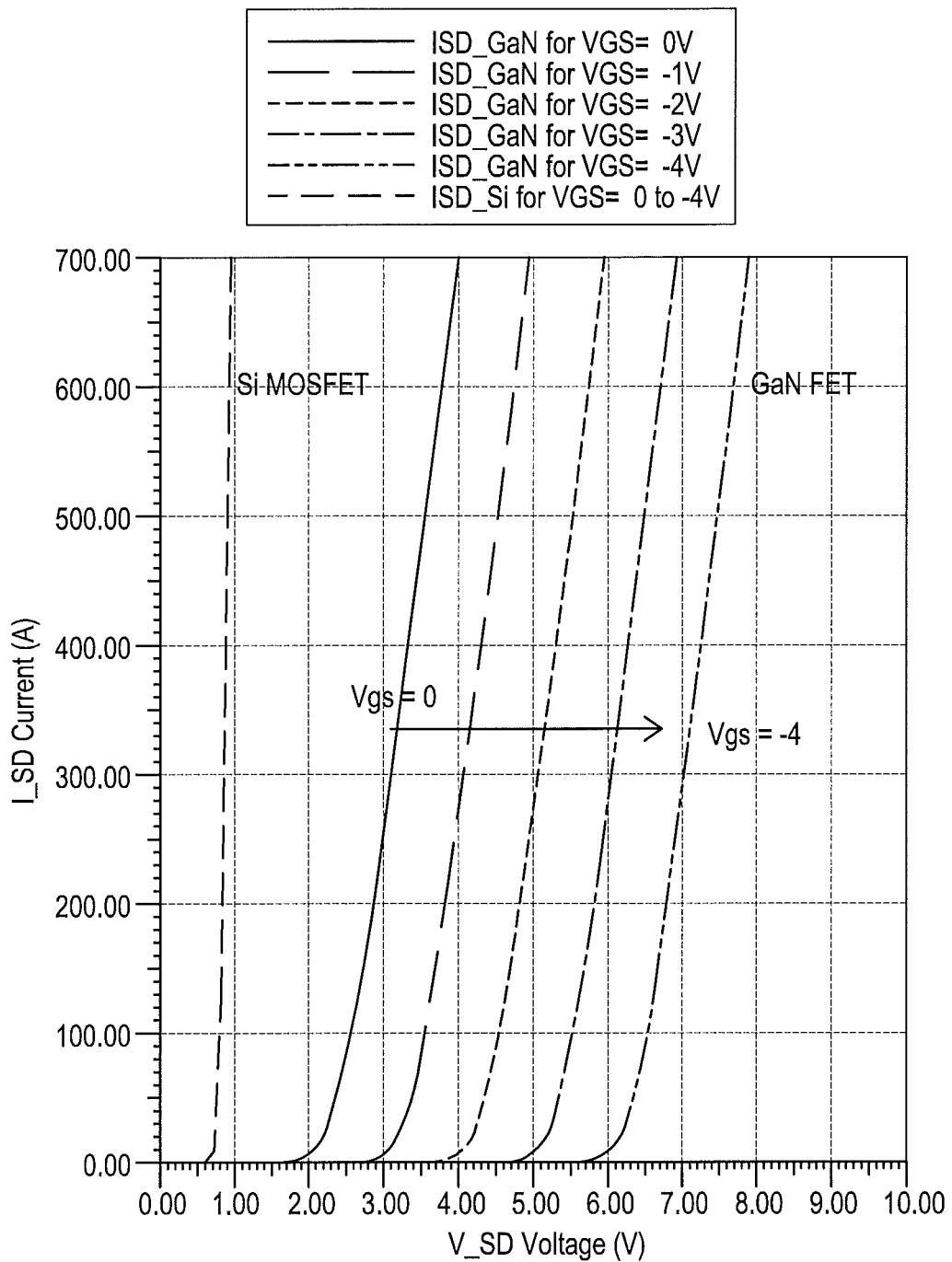
FIG. 6 shows a simulation of the reverse bias current-voltage characteristic of a Si MOSFET and the reverse bias current-voltage characteristics of a GaN FET for several different values of $V_{GS}$.

FIG. 6 shows a simulation of the reverse bias current-voltage characteristic of a GaN FET for several different values of $V_{GS}$. The same simulation for a Si MOSFET is also shown in FIG. 6 for comparison. For the Si MOSFET, the reverse bias source-drain characteristic of the body diode is independent of $V_{GS}$. By contrast, for the GaN FET, the reverse bias source-drain characteristics exhibit a strong dependence on $V_{GS}$. In particular, the reverse conduction threshold voltage can be increased significantly by applying a negative $V_{GS}$. In the simulation shown, by increasing $V_{GS}$ from 0V to −4V, the threshold voltage can be increased from approximately 2V to 6V. In real devices, the threshold voltage will depend on the specific device properties, material quality, manufacturing process etc. The large and controllable threshold voltage has significant impact on the operation of the inverter 220 when a fault occurs, as is discussed in more detail below.

Figure 7:
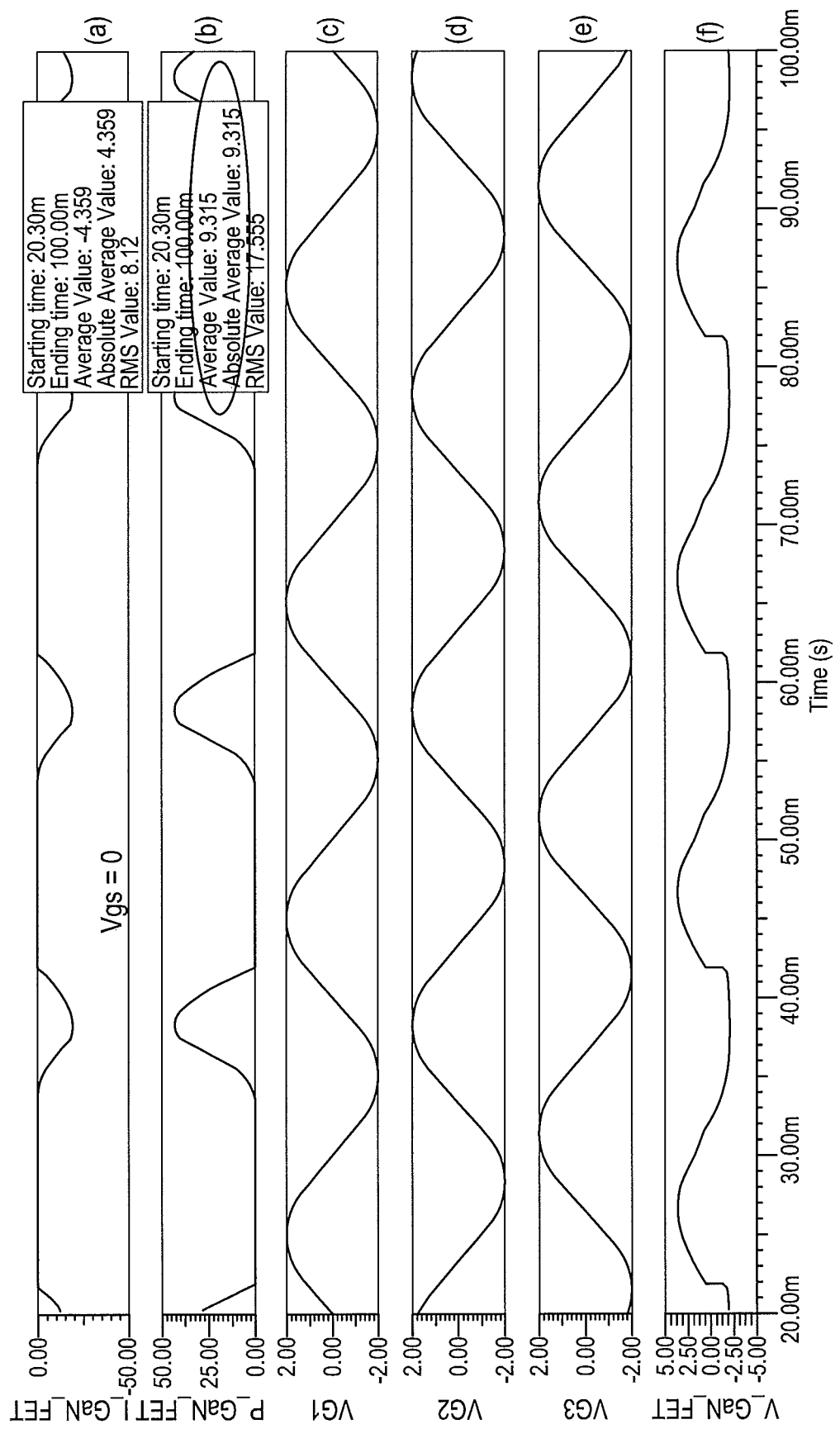
FIGS. 7 and 8 show simulation results for the circuit of FIG. 5.

FIG. 7 shows results of a simulation of the circuit shown in FIG. 5 when GaN FET 222a cannot be turned off and all other GaN FETs 222b, 224a, 224b, 226a, 226b are switched OFF by applying zero $V_{GS}$. The simulation parameters are the same as those used for FIG. 4. Graphs (a), (b) and (f) show, respectively, the drain current, power dissipation and $V_{DS}$ in the healthy GaN FET 224a against time (similar results are found for MOSFET 226a). Data is plotted on the same scale as that used in FIG. 4. Similar to results of FIG. 4, a damping current flows when $V_{DS}$ is negative and exceeds the threshold voltage of the GaN diode (approximately 2V for zero $V_{GS}$). Notably, the GaN FET 224a exhibits reduced drain current compared to Si MOSFETs (see e.g. FIG. 4), however, the larger threshold voltage means that the resulting peak power dissipation (FIG. 7 is approximately the same in the Si MOSFET. Plots (c) to (e) show the back-EMF on each of the three phases (A, B, C).

Figure 8:
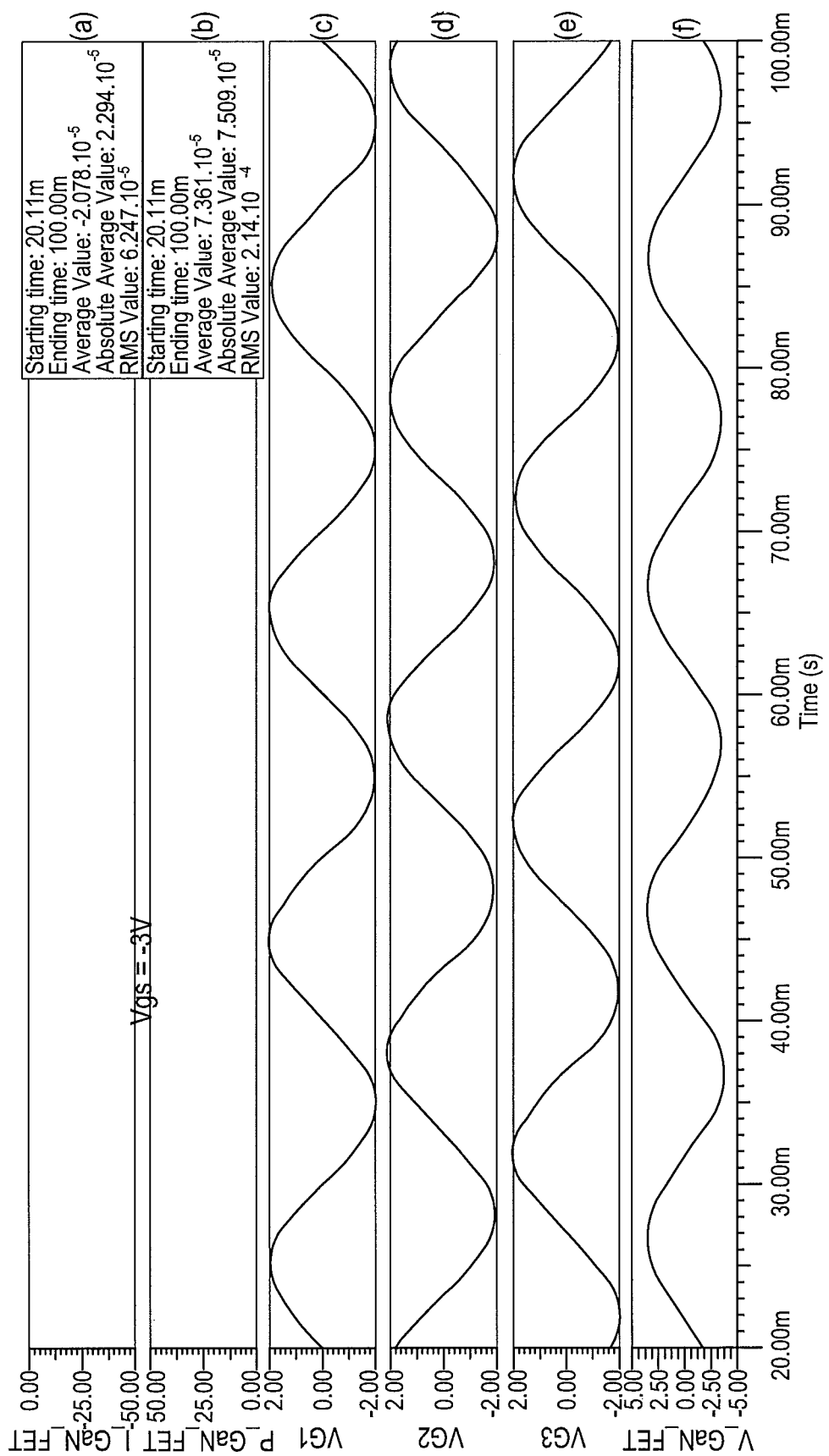

In FIG. 8 the simulation of FIG. 7 is repeated but with $V_{GS}$ equal to −3V applied to each undamaged GaN FET 222b, 224a, 224b, 226a, 226b (GaN FET 222a is still permanently ON). Graphs (a), (b) and (f) show, respectively, the drain current, power dissipation and $V_{DS}$ in the healthy GaN FET 224a against time (similar results are found for MOSFET 226a). As shown in plots (a) and (b), no damping current flows in the circuit and therefore no power is dissipated. In other words, the GaN FETs 222b, 224a, 224b, 226a, 226c have effectively blocked the damping current. This is a result of the threshold reverse conduction voltage of the GaN FET "diode" being shifted above the peak back-EMF by applying a negative $V_{GS}$. Plots (c) to (e) show the back-EMF on each of the three phases.

In an embodiment, during normal operation of the system 200 (when there is no fault), the $V_{GS}$ used to turn the GaN FETs 222a, 222b, 224a, 224b, 226a, 226c OFF can be kept close to 0V to minimise conduction losses. When a fault is detected in one of the inverters 220, 220', e.g. where one of GaN FETs 222a, 222b, 224a, 224b, 226a, 226c has failed in short-circuit mode, a negative $V_{GS}$ can be applied to the remaining undamaged GaN FETs in order to block the damping currents generated by the back-EMF from motor 230. This operation can be performed once the motor phase currents have decreased to safe level to avoid damaging the healthy FETs. For example, to aid safe turn-off, the negative $V_{GS}$ can be applied when the current passing through the GaN FET is close to zero. Circulating current levels in each device can be measured using well known techniques and current thresholds for safe turn-off can be defined on a specific application basis (e.g. devices used, thermal interface etc.).

As the amplitude of the back-EMF is dependent on the speed of the motor 230, the inverter circuit 220, 220' in FIG. 5 can be used to prevent damping currents up to relatively high motor speeds. Typical motor speeds may be in the range 0-6000 rpm. The method of blocking reverse conduction according to the present invention is limited by the minimum $V_{GS}$ rating of the GaN FET (the largest negative voltage that can be applied before damaging the device).

Figure 9:
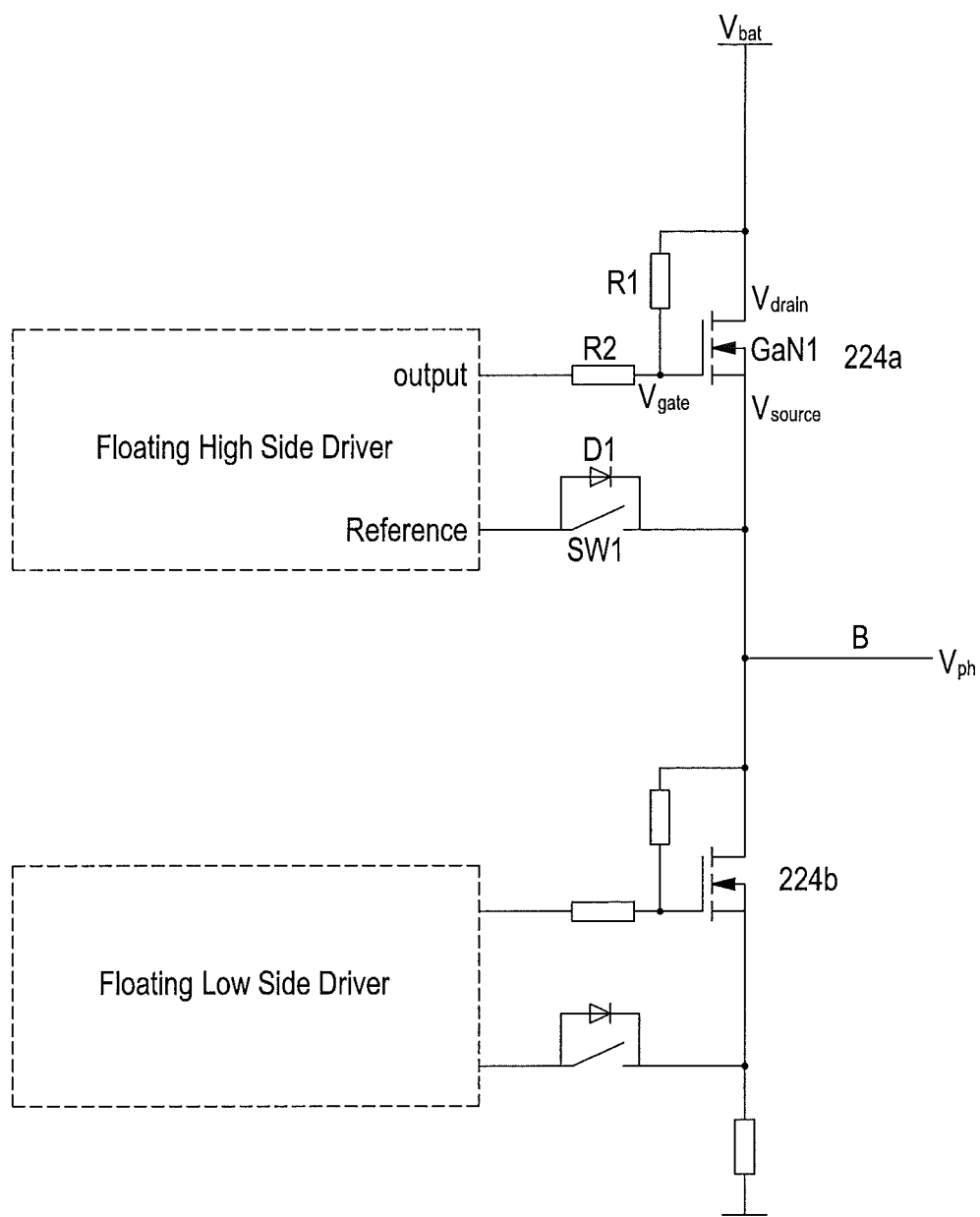
FIG. 9 shows a gate drive circuit configuration according to an embodiment of the invention.

In another embodiment, a negative $V_{GS}$ may be applied via the back-EMF itself, rather than by the gate driver, FIG. 9 shows an example gate driver circuit configuration for implementing this embodiment. Although FIG. 9 shows the gate driver connections for GaN FET 224a and 224b (arm B of inverter 220), it is representative of the gate connections for each arm of inverter 220. The description below focuses on GaN FET 224a, but applies equally to each GaN FETs in inverter 220 (or as the case may be, inverter 220').

The output of the gate driver applies voltages to the gate, referenced to the source. A gate resistor R2 may be positioned between the output of the gate driver and the gate. Ordinarily, as shown in FIG. 5, the gate driver is connected to the gate and the source, and the gate is isolated from the source-drain circuit by the gate insulator. In this embodiment, the gate is also connected to the drain via resistor R1. In addition, a switch SW1 is positioned between the source and gate driver reference, and a diode D1 is connected in parallel to the switch SW1. Although FIG. 9 shows the switch SW1 and diode D1 positioned between the source and gate driver reference, the switch SW1 and diode D1 may instead be positioned between the gate and the gate driver output. The circuit of FIG. 9 operates in three distinct modes, as described below, Normal operation (mode 1): Under normal operation, the switch SW1 is closed. The gate driver is connected to the circuit as normal, switching the GaN FET 224a ON and OFF as required to provide the PWM phase voltage ($V_{ph}$) to motor phase B. The resistor R1 is sufficiently large such that current flow through R1 is minimal, and the output of the gate driver dictates the voltage applied to the gate. R1 therefore has negligible effect on the operation of the circuit under normal operation. The diode D1 is oriented such that it would be forward biased if the switch SW1 were opened.

Blocking mode: When a fault condition or fault event is detected in one of the inverters 220, 220', e.g. where one of GaN FETs 222a, 222b, 224b, 226a, 226c has failed in short-circuit mode, or for any other reason damping currents need to be blocked, the remaining healthy GaN FETs are nominally switched OFF by setting $V_{GS}$ to zero on the gate driver. In addition, switch SW1 is then opened, thereby preventing the gate driver from driving the GaN FET. This operation can be performed once the motor phase currents have decreased to safe level to avoid damaging the healthy FETs. For example, to aid safe turn-off, the GaN device may be nominally switched OFF and switch SW1 opened when the current passing through the GaN FET is close to zero. Circulating current levels in each device can be measured using well known techniques and current thresholds for safe turn-off can be defined on a specific application basis (e.g. devices used, thermal interface etc.). For example, the timing may be based on monitoring the motor position or current in each phase.

The operation of gate driver circuit of FIG. 9 in blocking mode (switch SW1 open) then proceeds in one of two ways depending on the value of back-EMF, discussed below.

Mode 2: If the back-EMF from the motor phase is greater than $V_{bat}$, such that $V_{ph} > V_{bat}$, the GaN FET 224a and the diode D1 are reverse biased. In this scenario, a negative $V_{GS}$ should be applied to prevent the GaN device from turning ON. As the diode D1 reverse biased, it does not conduct and the gate drive remains disconnected from driving the GaN FET 224a. This allows the voltage on the gate to follow the drain voltage. Since the GaN FET 224a is reverse biased, the gate voltage with respect to the source ($V_{GS}$) is negative. The applied negative $V_{GS}$ is approximately equal to the reverse bias applied to the GaN FET 224a. This ensures the GaN FET 224a is held OFF when reverse biased under high back-EMF conditions.

Mode 3: If the back-EMF from the motor phase is less than the voltage supplied by the battery ($V_{bat}$), such that $V_{ph} < V_{bat}$, the GaN FET 224a and the diode D1 are forward biased. As the diode D1 is forward biased it will start to conduct when its threshold turn-on voltage is reached, at which point the gate driver is connected to the circuit as normal, and can hold the GaN FET 224a OFF (by maintaining zero $V_{GS}$). As with the normal operation mode (mode 1), resistor R1 has negligible effect on the operation of the circuit. This ensures damping currents are blocked under low back-EMF conditions.

For effective operation in mode 2, it is important that any leakage paths through the gate driver are controlled to prevent the gate driver from pulling the gate voltage away from the drain voltage, which could lead to the GaN device turning ON.

Figure 10:
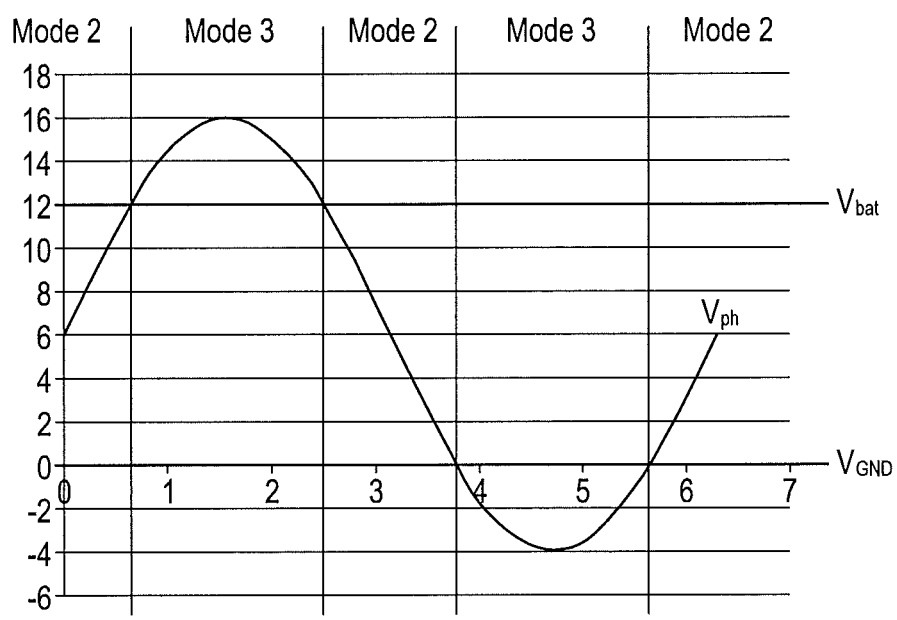
FIG. 10 shows the time varying voltage generated from a motor phase (back-EMF) and the supply voltages to an inverter.

FIG. 10 shows $V_{ph}$ (the back-EMF) versus time compared to typical values of the supply voltages (12V $V_{bat}$, 0V $V_{GND}$), illustrating how the circuit operates in different modes as the motor rotates. In the example shown, the amplitude of $V_{ph}$ is greater than $V_{bat}$ and the mode of operation alternates between mode 2 and mode 3 as the back-EMF changes. In other words, the value of $V_{GS}$ changes continuously and automatically in response to the instantaneous value of the back-EMF. This means that no active monitoring of the back-EMF is required to enable the blocking feature. Note that when $V_{ph} > V_{bat}$ GaN FET 224a is reverse biased, whereas corresponding GaN FET 224b is forward biased. Conversely, when $V_{ph} < V_{GND}$. GaN FET 224a is forward biased, whereas GaN FET 224b is reverse biased.

The switch SW1 may be a Si MOSFET and diode D1 may be the intrinsic Si body diode, having a characteristic low turn on voltage. Alternatively, the switch SW1 may be any switching element with or without a body diode. When D1 is not a body diode, it may be any suitable diode connected in parallel with the switching element. The diode threshold voltage is preferably low and the break down voltage preferably high.

The resistance of resistor R1 may substantially be in the range 1 kΩ to 10 kΩ, or 10 kΩ to 100 kΩ. The value of R1 is chosen to minimise current flow through it and allow the gate driver to control the gate. Its value will depend on the properties of the circuit (e.g. supply voltages, gate voltages and device resistances). The value of the gate resistor R2 may be substantially in the range 0Ω-10Ω. Its value will depend on various properties of the circuit, including the required dynamic properties of the GaN FET.

Although in the previous embodiments GaN devices are described, it will be understood that the principle of the method is the control over the reverse conduction in the switching device when it is nominally turned OFF or, more specifically, controlling the reverse conduction threshold voltage such that it is comparable to or preferably greater than the reverse bias on the device generated by high back-EMFs the motor 230. Thus the invention is not limited to GaN devices, and any semiconductor switching device that exhibits a body diode or diode-like behaviour when nominally switched OFF with a gate tuneable threshold voltage can be utilised to achieve the solution.

Advantageously, the invention prevents, or at least substantially suppresses, damping currents without the need for additional circuit components such as a blocking relays or switches which occupy valuable space, dissipate power and are expensive. When a fault is detected, aspects and embodiments of the invention allow the faulty inverter to be effectively disabled.

A bridge power switch short circuit may be detected by monitoring $V_{DS}$: a voltage higher than expected (higher than a predefined threshold when the monitored switch is turned ON would mean the other switch in the same phase arm is shorted (low resistance). A power switch short-circuit may also be detected by monitoring one or more of the drain current, $V_{GS}$, motor speed, current and voltage of the motor phases. Such parameters may be monitored by any well-known means. Fault detection may be facilitated by comparing any one of said parameters to a predetermined threshold value.

In the embodiments described above, the event is an internal failure event such as a short-circuit fault in one or more switching devices 122a, 122b, 124a, 124b, 126a, 126b; 222a, 222b, 224a, 224b, 226a, 226b. However, an event that effects current flow in the circuit may be due to an external factor that affects the motion of the motor 130 whilst all switching devices 122a, 122b, 124a, 124b, 126a, 126b, 222a, 222b, 224a, 224b, 226a, 226b remain operational. Such an event may be caused, for example, during garage servicing of a vehicle if the motor 130, 130' happens to be used as a generator. In a scenario where the vehicle and EPS system is turned off, the switching elements in both inverters are left deactivated in the OFF state. If the steering wheel is rotated, the corresponding rotation of the motor 130, 130' generates a back-EMF. In this case, the body diodes of some or all of the Si FETs 122a, 122b, 124a, 124b, 126a, 126b will conduct if the back-EMF phase-to-phase voltage exceeds the battery voltage by the body diode threshold voltage. Damage to the EPS system can potentially occur if the steering wheel is turned sufficiently rapidly (e.g. by a user or service engineer). It is therefore desirable to protect the switching elements in the inverter bridge from external events. Again, the body diode of a Si MOSFET 122a, 122b, 124a, 124b, 126a, 126b will conduct as soon as the voltage drop across it is above the fixed, uncontrolled threshold (usually 0.6V).

Figure 11:
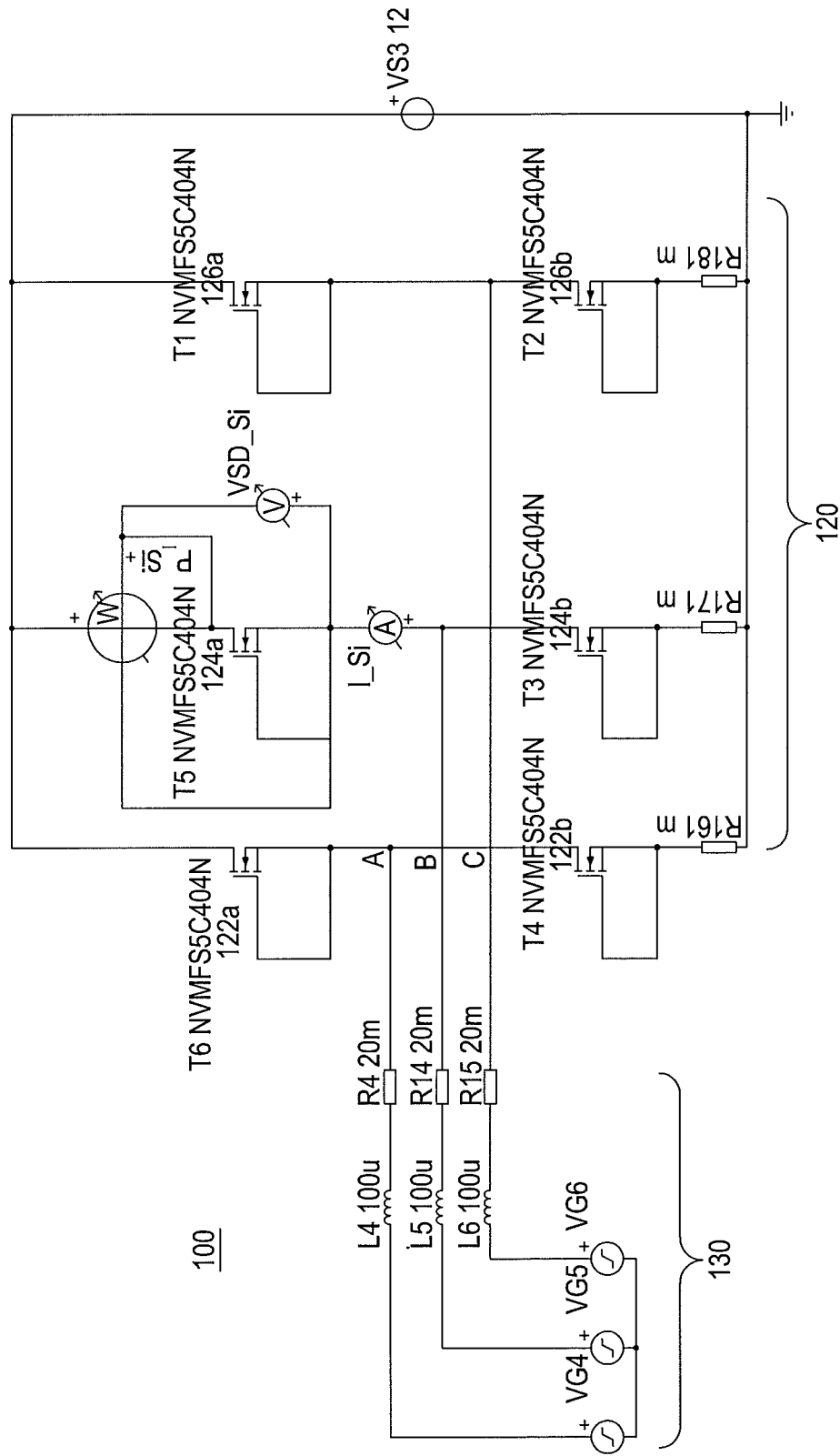
FIG. 11 shows a simplified schematic of one side of a dual-bridge system comprising Silicon MOSFETs.
Figure 12:
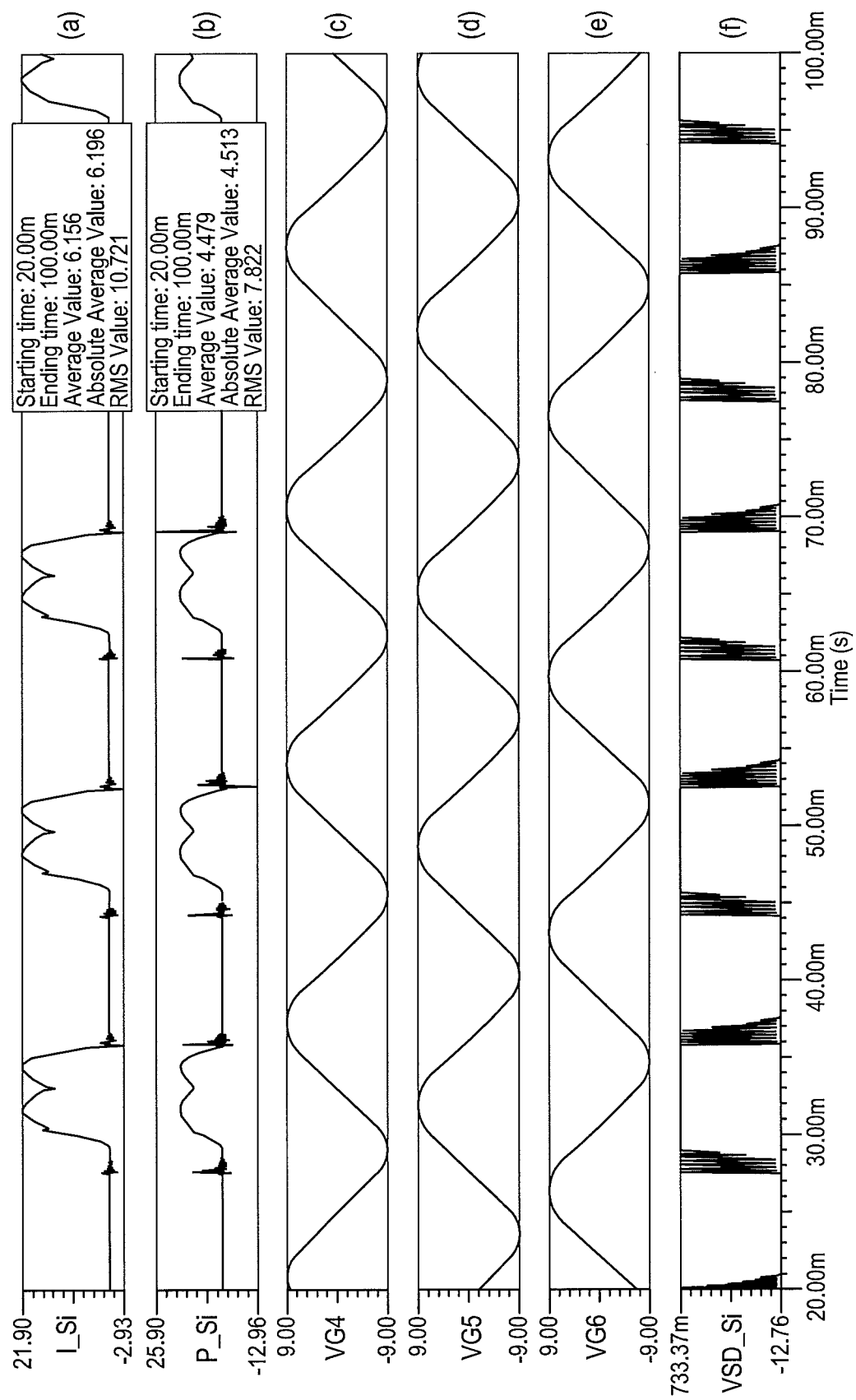
FIG. 12 shows simulation results for the circuit of FIG. 11.

FIG. 11 shows a circuit 100 simulating the scenario where all Si MOSFETs 122a, 122b, 124a, 124b, 126a, 126b are switched OFF and the motor 130 is used as a generator. FIG. 12 shows the results of a simulation where a peak back-EMF of 9V is generated at a frequency of 60 Hz, the battery voltage is 12 V. Under these conditions, the Si MOSFET used (e.g. NVMFS5C404N) would dissipate approximately 4.5 W because of its body diode.

Figure 13:
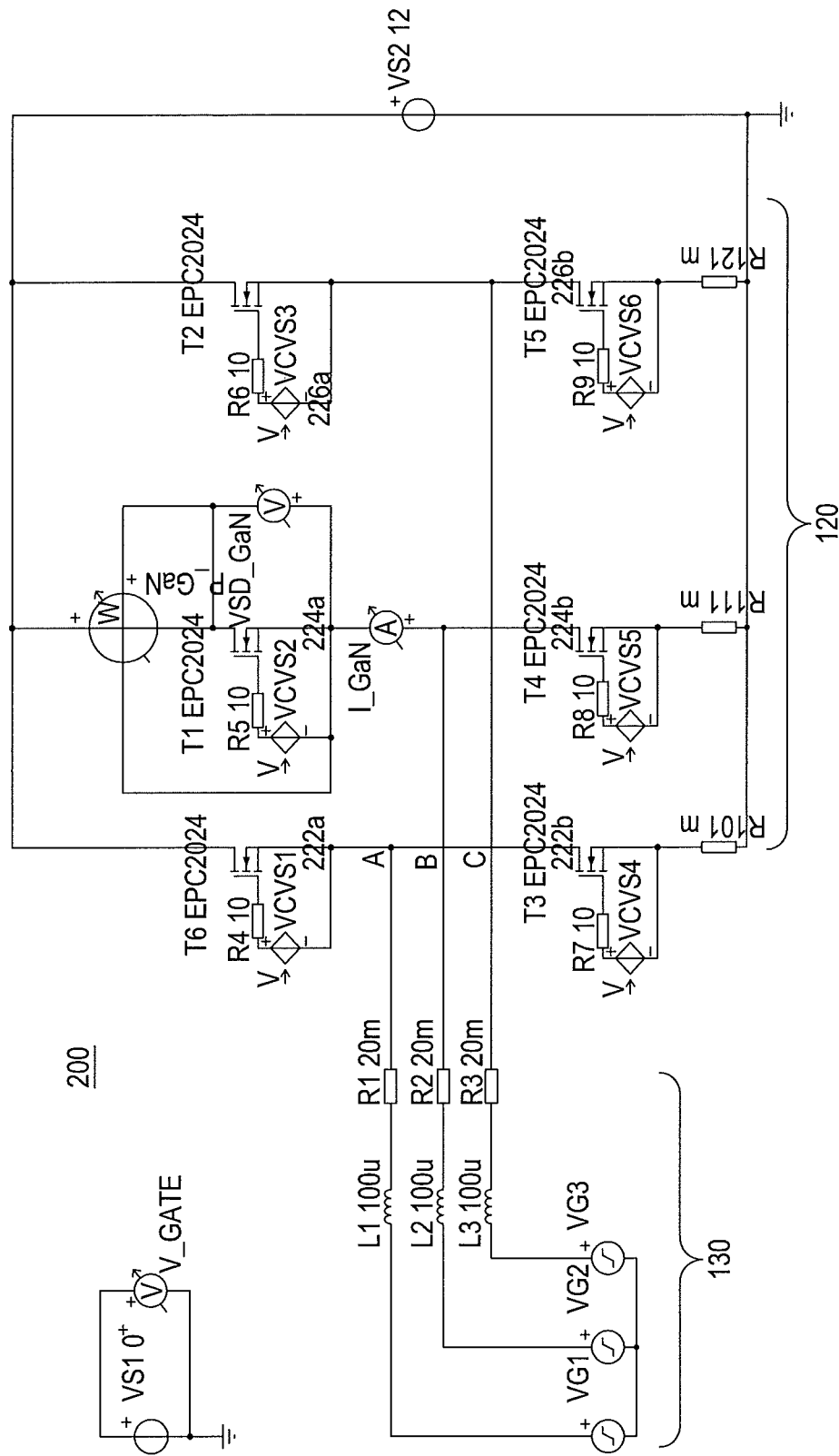
FIG. 13 shows a simplified schematic of one side of a dual-bridge system comprising GaN FETs.
Figure 14:
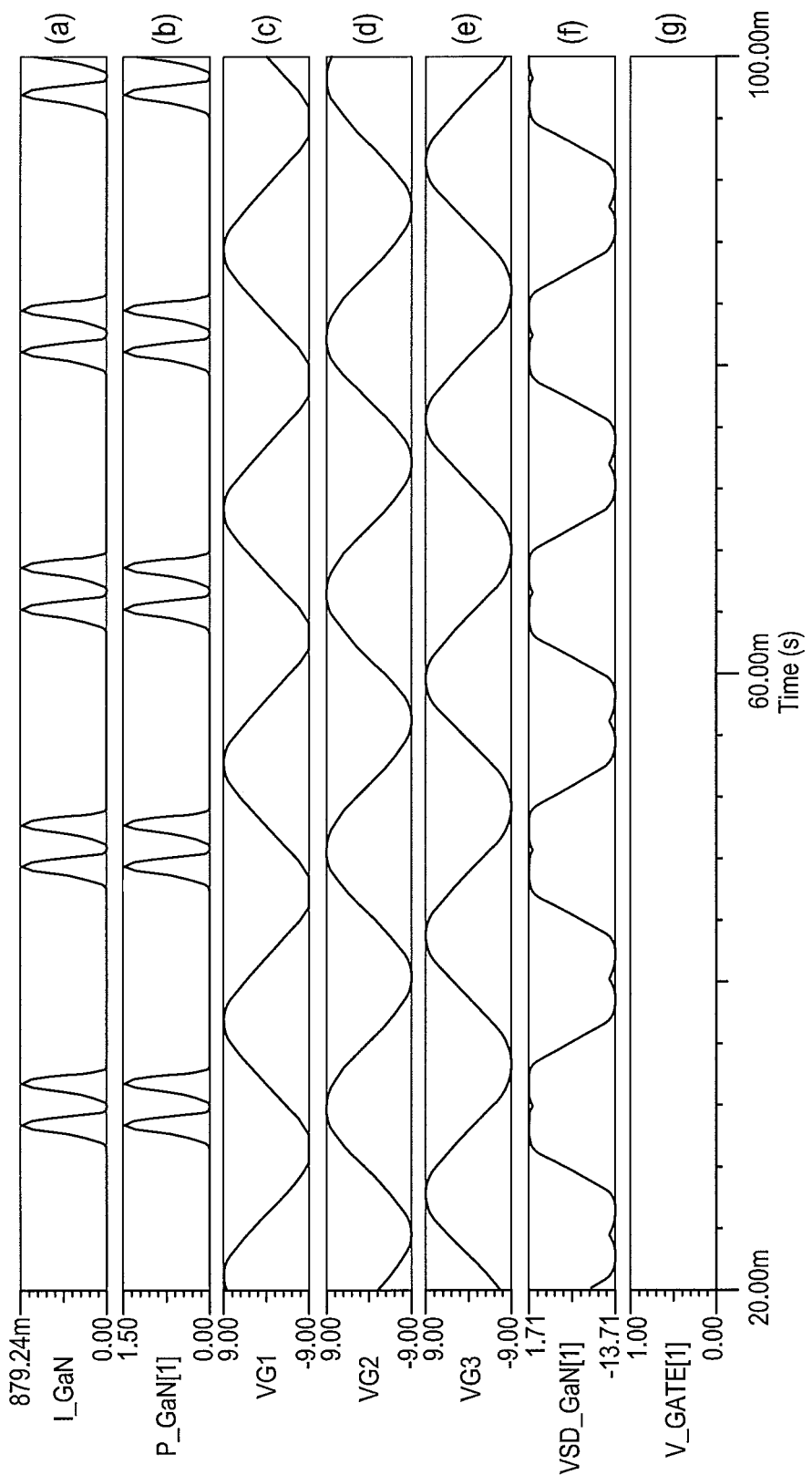
FIGS. 14 to 17 show simulation results for the circuit of FIG. 13-16.
Figure 15:
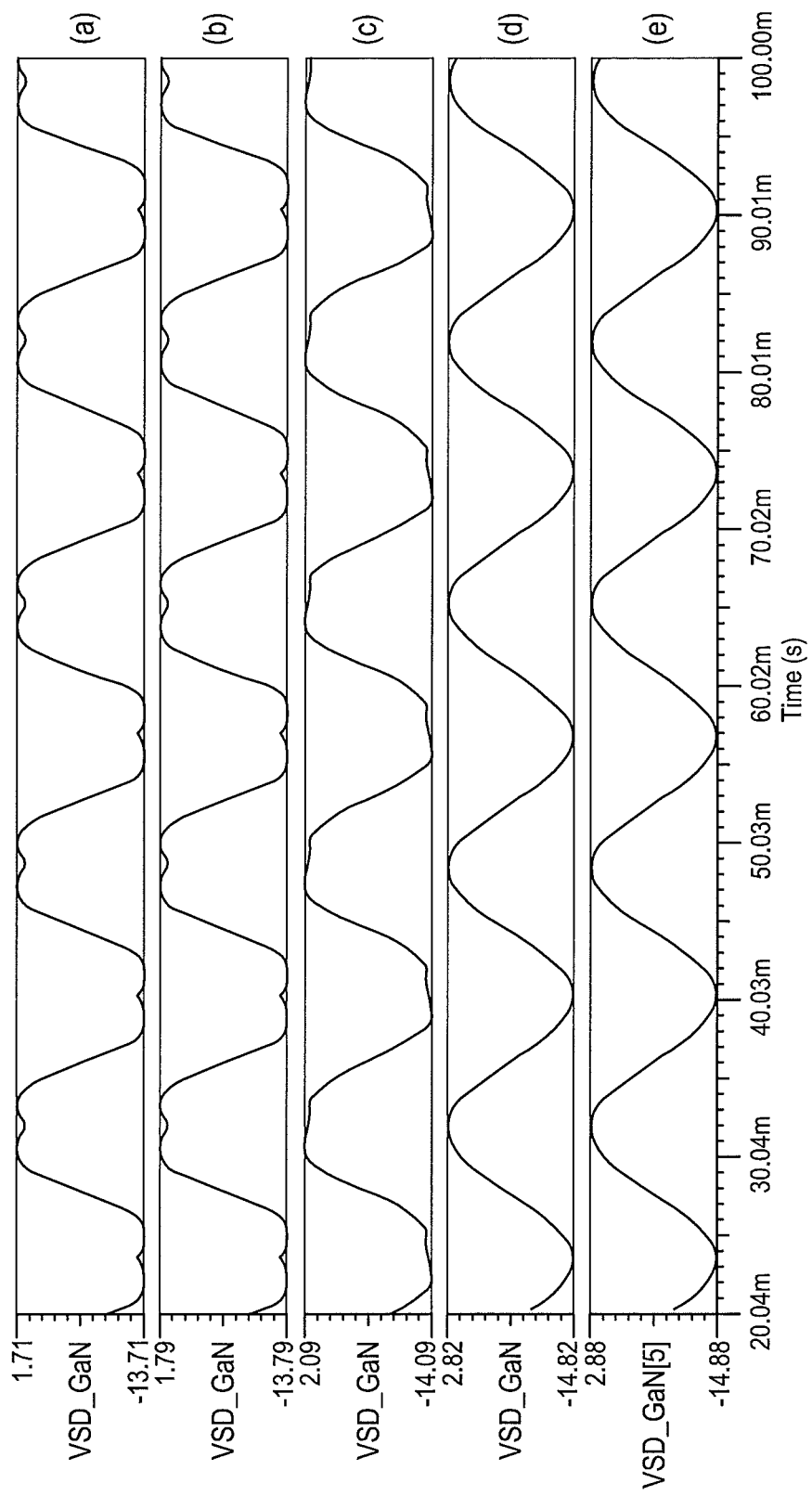
Figure 16:
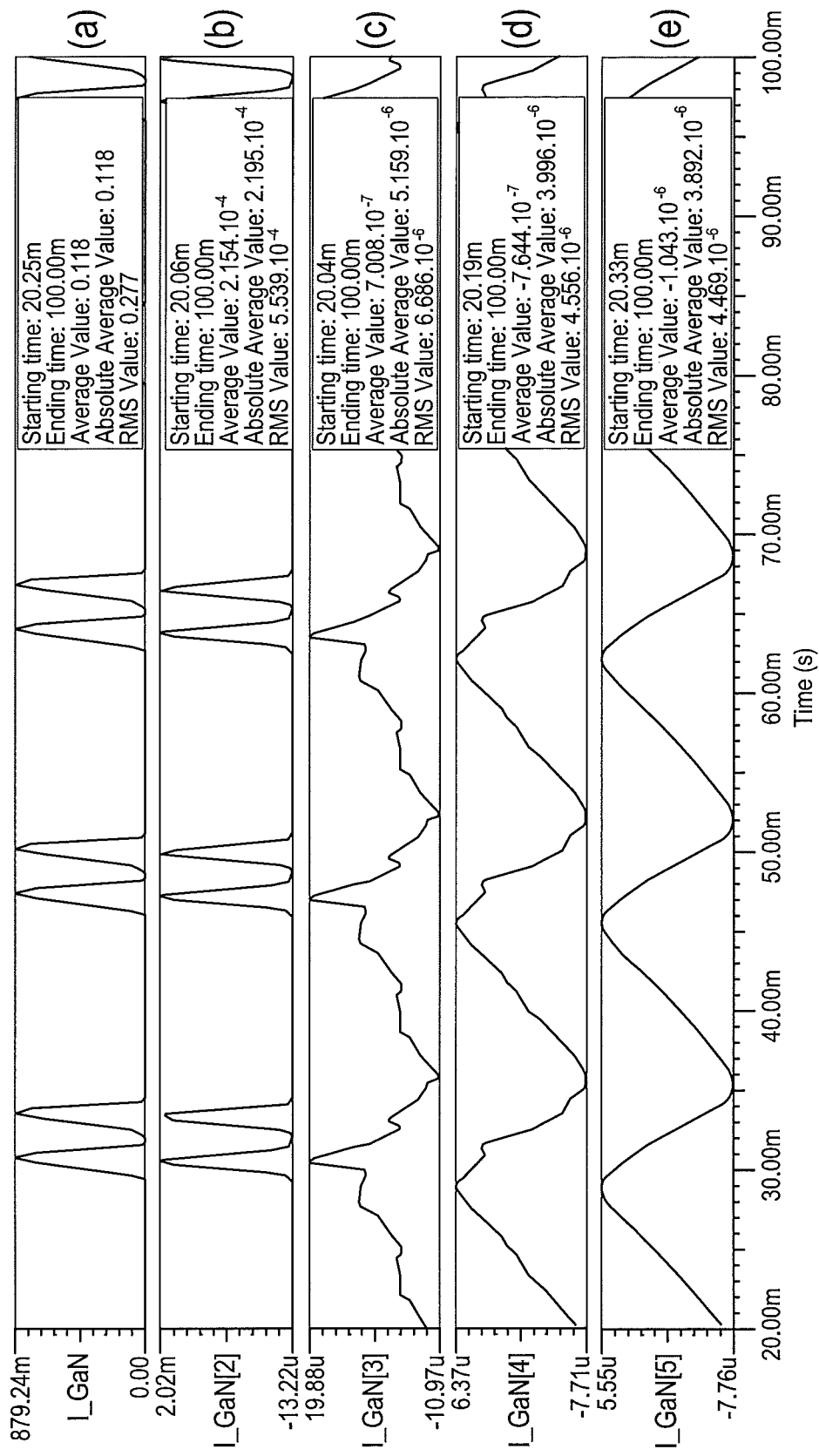
Figure 17:
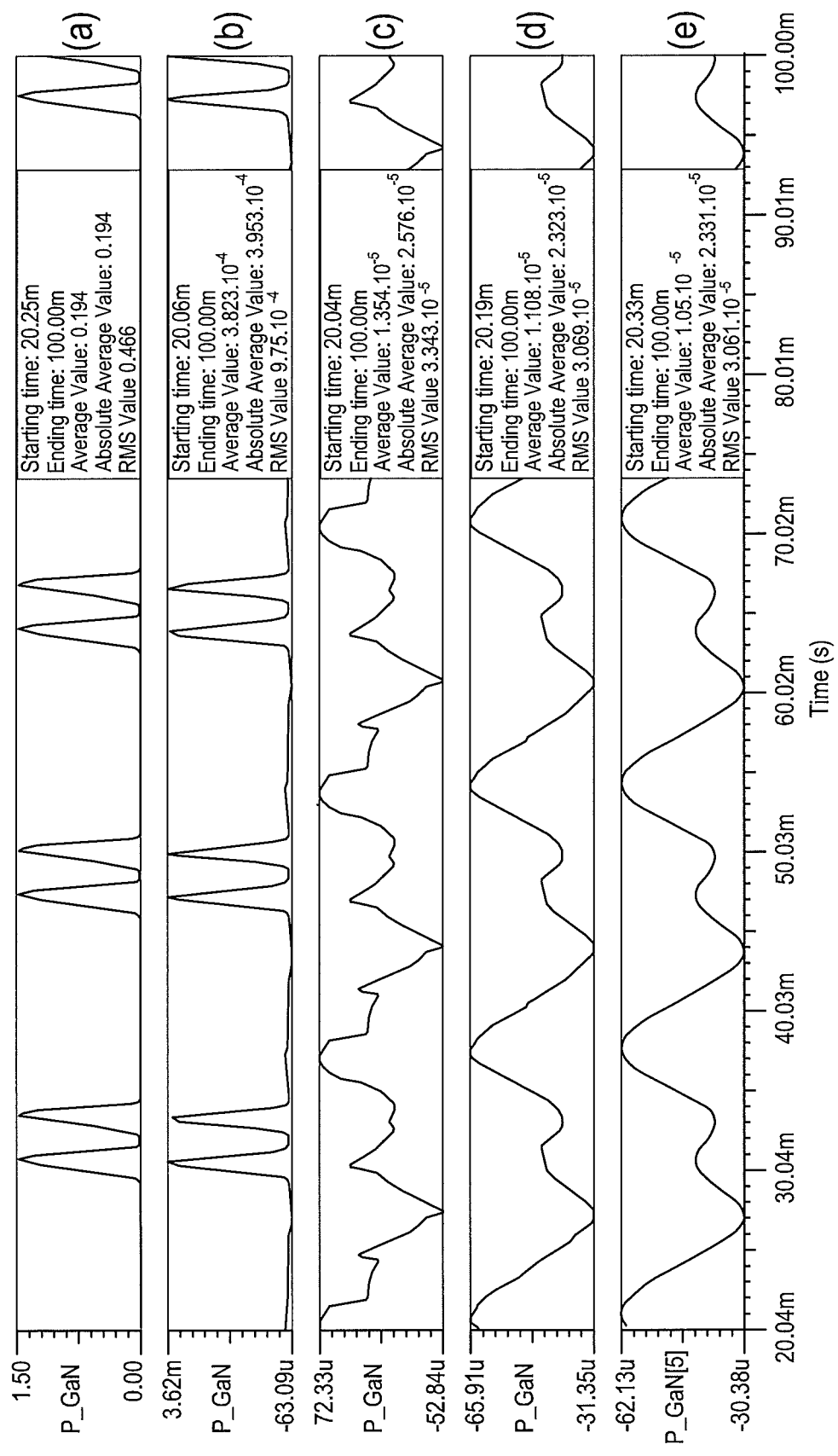

FIG. 14 shows the simulation results for the circuit shown in FIG. 13 comprising GaN FETs 222a, 222b, 224a, 224b, 226a, 226b under conditions of zero $V_{GS}$. Graphs (a), (b) and (f) show, respectively, the drain current, power dissipation and $V_{DS}$ in GaN FET 224a against time (similar results are found for all other MOSFETs 222a, 222b, 224b, 226a, 226b). Plots (c) to (e) show the back-EMF on each of the three phases A, B, C. As can be seen, because the reverse conduction threshold voltage of the GaN body-like diode is larger than that for a Si MOSFET body diode, the GaN FET can withstand higher back-EMF before conducting and thus dissipate less power, 0.2 W in this simulation. FIGS. 15, 16 and 17 show, respectively, plots of $V_{DS}$, drain current and dissipated power against time as $V_{GS}$ is decreased from 0V to −4V in steps of 1V. Most notably, the peak drain current in the simulation is reduced from 880 mA to 5.5 μA and the dissipated power is reduced from 1.5 W to 60 μW as $V_{GS}$ is decreased from 0V to −4V. Thus, damping currents and power dissipation are substantially reduced and the associated excess heat generation issues are avoided.

Protection from external events, such as garage servicing, according to an embodiment of the invention may be achieved by applying a negative gate voltage to the GaN FETS via the gate driver while the vehicle is switched off.

In another embodiment, protection from external events may be achieved using the gate driver circuit of FIG. 9 by holding switch SW1 open while the vehicle is switched off.

Aspects and embodiments of the invention therefore avoid the need for phase isolation components in single bridge designs. In dual bridge designs, aspects and embodiments of the invention allows for operation at near 50% performance in single lane reversionary mode, without the need to oversize the system.

Figure 18:
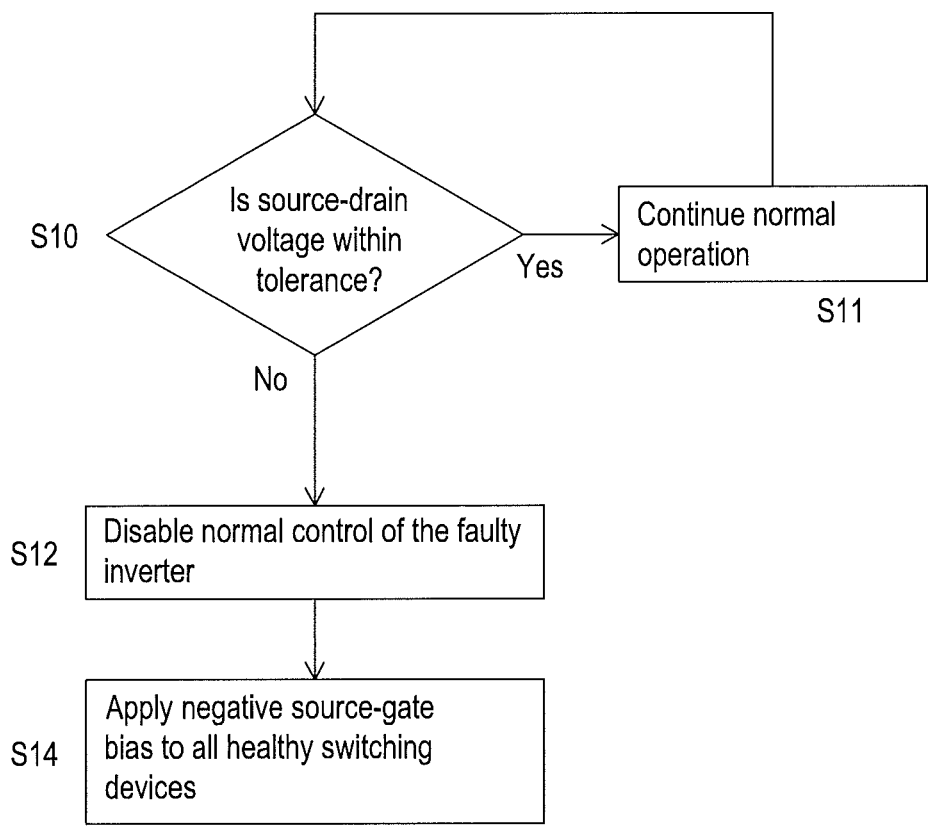
FIG. 18 is a flowchart of a control method in accordance with an embodiment of the invention.

A method of carrying out an embodiment of the invention is summarised in FIG. 18. In step S10 a determination or detection is made that a failure event has occurred in one of the bridges 220, 220'. Determining whether an internal failure event has occurred may be achieved using standard techniques, for example, monitoring $V_{DS}$ of each switching device in each bridge, and checking if it is within a predefined threshold value or tolerance. If $V_{DS}$ is within the predefined tolerance, normal operation is continued at step S11. If $V_{DS}$ is outside the predefined tolerance, in step S12, normal operation of the faulty bridge (220 or 220') is disabled by applying zero $V_{GS}$ to each switching device in the faulty bridge after having waited for the current in each device to decrease below a certain threshold current. In step S14, the blocking mode is enabled by applying a negative $V_{GS}$ to each healthy switching device having waited for the current in each device to decrease below a certain threshold current. Assuming again that GaN FET 222a is faulty, a negative $V_{GS}$ is applied to undamaged GaN FETs 222b, 224a, 224b, 226a, 226b. The value of $V_{GS}$ applied may be the largest negative possible voltage that can be applied (based on the device specification).

In an embodiment, the value of $V_{GS}$ applied may depend on the speed of the motor. For example, at higher motor speeds where the generated back-EMF can be larger, a larger $V_{GS}$ may be applied.

Figure 19:
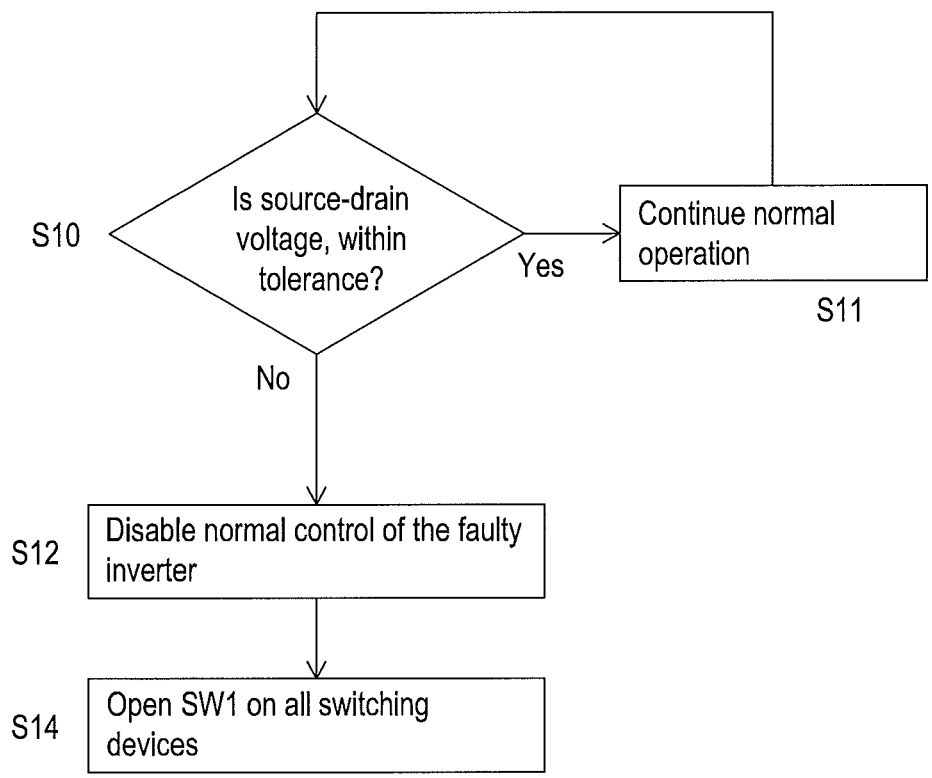
FIG. 19 is a flowchart of a control method in accordance with another embodiment of the invention.

A method of carrying out another embodiment of the invention is summarised in FIG. 19. In step S10 a determination or detection is made that a failure event has occurred in one of the bridges 220, 220'. Determining whether an internal failure event has occurred may be achieved using standard techniques, for example, monitoring $V_{DS}$ of each switching device in each bridge, and checking if it is within a predefined threshold value or tolerance. If $V_{DS}$ is within the predefined tolerance, normal operation is continued at step S11. If $V_{DS}$ is outside the predefined tolerance, in step S12, normal operation of the faulty bridge (220 or 220') is disabled by applying zero $V_{GS}$ to each switching device in the faulty bridge after having waited for the current in each device to decrease below a certain threshold current. In step S14, the blocking mode is enabled by opening switch SW1 on all switching devices in the faulty inverter having waited for the current in each device to decrease below a certain threshold current.

The healthy inverter continues to operate normally. As damping currents in the faulty inverter are effectively suppressed, the healthy inverter can deliver 50% power assist. If a fault is detected, further offline checks can be performed to determine the actual nature of the fault, again using conventional techniques.

In the event of a faulty switching device in dual-bridge EPS control system, therefore, a circuit and procedure is established for effectively disabling the faulty inverter to avoid damping currents circulating therein, whilst power is solely provided by the other "healthy" inverter bridge. This ensures that the power output of the healthy inverter is not adversely affected by the faulty one.

From reading the present disclosure, other variations and modifications will be apparent to the skilled person. Such variations and modifications may involve equivalent and other features which are already known in the art, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several

What is claimed is:

1. A method of controlling an electric power assisted steering system comprising one or more inverter bridges each connected to a multi-phase motor configured to provide power assist to steering of a vehicle, wherein each inverter bridge comprises a plurality of switching elements each associated with a phase of the motor, and wherein the switching elements are configured to conduct in an off-state when reverse biased beyond a reverse conduction threshold voltage, the method comprising:
in response to detecting a predefined event affecting current flow in one or more of the inverter bridges, preventing current flow in the one or more affected inverter bridges by applying a gate-source voltage to one or more of the switching elements of the one or more affected inverter bridges to control the reverse reduction threshold voltage in the off-state.

2. The method of claim 1, wherein detecting the predefined event comprises detecting a failure event at or within one of the switching elements within an inverter bridge.

3. The method of claim 1, wherein detecting the predefined event comprises detecting an interruption of power to the electric power assisted steering system.

4. The method of claim 1, wherein applying the gate-source voltage comprises applying a negative gate-source voltage to control the reverse conduction threshold voltage of the switching elements in the off-state.

5. The method of claim 1, wherein applying the gate-source voltage further comprises applying the gate-source voltage using a gate driver.

6. The method of claim 5, wherein applying the gate-source voltage further comprises:
(i) opening a switch, disconnecting the gate driver from driving the switch and applying the gate-source voltage using a phase voltage generated by the motor; or
(ii) opening a switch and applying the gate-source voltage using the gate driver.

7. The method of claim 6, wherein, in (i), opening the switch further comprises allowing the gate voltage to follow a drain voltage.

8. The method of claim 4, further comprising determining the reverse bias across the switching element and controlling the reverse conduction threshold voltage in the off-state to be greater than the reverse bias applied across the switching element to prevent current flow.

9. The method of claim 2, wherein preventing current flow in the one or more affected inverter bridges in response to the detecting the failure event at or within one of the switching elements within the one or more affected inverter bridges further comprises switching off the other switching elements in the one or more affected inverter bridges.

10. The method of claim 3, wherein preventing current flow within the one or affected inverter bridges in response to detection of the interruption of power to the electric power assisted steering system comprises switching off every switching element in each of the one or more affected inverter bridges.

11. The method of claim 1, wherein applying the gate-source voltage further comprises applying a gate-source voltage when the current flow in each phase is below a predefined threshold current value.

12. The method of claim 2, wherein detecting the failure event comprises monitoring one or more of:
a source-drain voltage of the/each switching element;
a current direction within the/each switching element;
a current or voltage on the motor phases; and
the method further comprises comparing one or more of these determined monitoring parameters to a corresponding predetermined threshold value.

13. The method of claim 1, wherein preventing current flow in the one or more affected inverter bridges occurs without using additional current blocking switching elements between the motor and the one or more affected inverter bridges.

14. The method of claim 1, wherein the applied gate-source voltage is less than a maximum source-gate voltage rating of the switching elements.

15. A control system for an electric power assisted steering apparatus comprising:
one or more inverter bridges each connected to a multi-phase motor configured to provide power assist to steering of a vehicle, each inverter bridge having a plurality of switching elements each associated with a phase of the motor, wherein the switching elements are configured to conduct in an off-state when reverse biased beyond a reverse conduction threshold voltage; and
a control means configured to control the switching elements to control current to the phases of the motor under normal operation, and, in response to detecting a predefined event affecting current flow in one or more of the inverter bridges, control the switching elements in a blocking mode to prevent current flowing in the one or more affected inverter bridges by applying a gate-source voltage to one or more of the switching elements of the affected inverter bridges to control the reverse reduction threshold voltage in the off-state, in accordance with the method of claim 1.

16. The system of claim 15 wherein the control means comprises a gate driver connected between a gate electrode and a source electrode of the switching element.

17. The system of claim 16 wherein the control means further comprises:
a resistor connecting the gate electrode to a drain electrode of the switching element;
a switch connected between the gate driver and the source electrode, or between the gate driver and the gate electrode, the switch configured to be closed under normal operation and open in blocking mode; and
a diode connected in parallel to the switch.

18. The system of claim 17, wherein, in the blocking mode, (i) the control means is configured to disconnect the gate driver from driving the switching element when the switching element is reverse biased, such that the voltage on the gate electrode follows the drain voltage and the gate-source voltage is applied by a phase voltage generated from the motor; or (ii) the control means is configured to maintain the gate driver connection when the switching element is forward biased.

19. The system of claim 15, wherein the predefined event is a failure event at or within one of the plurality of switching elements within an inverter bridge, and the system further comprises a failure event detection means; or wherein the system further comprises a monitoring device for monitoring one or more of: the source-drain voltage of the/each switching element, the current direction within the/each switching element, and the current or voltage on the motor phases.

20. The system of claim 15, wherein the control means is configured to control the reverse conduction threshold voltage by applying a negative gate-source voltage to the switching element in the off-state.

21. The system of claim 15, wherein the switching elements are Gallium Nitride field effect transistors, or are n-type enhancement mode Gallium Nitride field effect transistors.

* * * * *